(12) United States Patent
Kitagawa

(10) Patent No.: US 9,402,009 B2
(45) Date of Patent: Jul. 26, 2016

(54) IMAGE PROCESSING APPARATUS, IMAGE CONTROL METHOD, AND RECORDING MEDIUM STORING IMAGE CONTROL PROGRAM

(71) Applicant: Hiroyuki Kitagawa, Kanagawa (JP)

(72) Inventor: Hiroyuki Kitagawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/688,087

(22) Filed: Apr. 16, 2015

(65) Prior Publication Data

US 2015/0304515 A1  Oct. 22, 2015

(30) Foreign Application Priority Data

Apr. 17, 2014  (JP) ................. 2014-085367

(51) Int. Cl.
*G06F 3/12* (2006.01)
*H04N 1/00* (2006.01)
*H04N 1/42* (2006.01)

(52) U.S. Cl.
CPC ....... *H04N 1/00885* (2013.01); *H04N 1/00103* (2013.01); *H04N 1/42* (2013.01)

(58) Field of Classification Search
None
See application file for complete search history.

(56) References Cited

U.S. PATENT DOCUMENTS

| | | | | |
|---|---|---|---|---|
| 5,396,546 A * | 3/1995 | Remillard | ........... | H04M 11/085 348/468 |
| 5,758,081 A * | 5/1998 | Aytac | ................. | H04M 11/06 709/212 |
| 5,854,694 A * | 12/1998 | Payne | ................. | H04N 1/107 358/473 |
| 6,128,104 A * | 10/2000 | Okabe | .................. | H04N 1/00 358/434 |
| 6,516,227 B1 * | 2/2003 | Meadows | ............ | A61N 1/0553 607/117 |
| 7,142,550 B1 * | 11/2006 | Umansky | ........... | H04L 12/5835 358/1.15 |
| 7,146,566 B1 * | 12/2006 | Hohensee | ......... | G06F 17/30905 707/E17.121 |
| 8,214,338 B1 * | 7/2012 | Kirchhoff | ......... | G06F 17/30746 379/67.1 |

(Continued)

FOREIGN PATENT DOCUMENTS

| | | |
|---|---|---|
| JP | 7-183979 | 7/1995 |
| JP | 2001-177683 | 6/2001 |

*Primary Examiner* — Madelein Nguyen

(74) *Attorney, Agent, or Firm* — Cooper & Dunham LLP

(57) ABSTRACT

An image processing apparatus includes a facsimile communication unit; a mail communication unit; an outputting unit; an external power source processing unit to operate the image processing apparatus using external power supplied from an external power source; a power-storing source processing unit to operate the image processing apparatus using stored power stored in a power-storing unit; a power source detection unit to detect whether the apparatus is operated with the external power or the stored power to output a detection result; and a facsimile data output control unit to transmit, when the facsimile communication unit receives facsimile data, the facsimile data to a destination address via e-mail with the mail communication unit based on the detection result indicating that the stored power is supplied, and to output the image of the facsimile data based on the detection result indicating that the external power is supplied.

12 Claims, 26 Drawing Sheets

(56) References Cited

U.S. PATENT DOCUMENTS

| | | | |
|---|---|---|---|
| 8,996,350 B1* | 3/2015 | Dub | G06F 17/30011 704/1 |
| 2001/0024440 A1* | 9/2001 | Pounds | H04L 12/10 370/356 |
| 2003/0056134 A1* | 3/2003 | Kanapathippillai | G06F 1/3203 713/324 |
| 2003/0059035 A1* | 3/2003 | Nebiker | H04L 12/58 379/399.01 |
| 2003/0108046 A1* | 6/2003 | Simeone | H04Q 11/04 370/395.1 |
| 2003/0164762 A1* | 9/2003 | Ridley | G08B 31/00 340/521 |
| 2004/0233475 A1* | 11/2004 | Mikuni | H04N 1/00281 358/1.15 |
| 2005/0138447 A1* | 6/2005 | Kobayashi | H04N 1/00896 713/300 |
| 2005/0179930 A1* | 8/2005 | Doi | G06F 1/3215 358/1.14 |
| 2006/0001920 A1* | 1/2006 | Moreno | H04N 1/00 358/498 |
| 2006/0271647 A1* | 11/2006 | Tindall | H04L 12/58 709/220 |
| 2007/0033637 A1* | 2/2007 | Yami | H04L 63/0428 726/2 |
| 2007/0240159 A1* | 10/2007 | Sugiyama | H04N 1/00885 718/102 |
| 2009/0051556 A1* | 2/2009 | McCain | G01R 31/3689 340/636.1 |
| 2009/0225357 A1* | 9/2009 | Miyake | H04N 1/00885 358/1.15 |
| 2009/0235102 A1* | 9/2009 | Koshika | G03G 15/5004 713/324 |
| 2011/0051189 A1* | 3/2011 | Suga | H04N 1/00832 358/1.15 |
| 2011/0130168 A1* | 6/2011 | Vendrow | H04M 1/57 455/556.1 |
| 2011/0134477 A1* | 6/2011 | Kuwahara | G06F 1/3284 358/1.15 |
| 2011/0199637 A1* | 8/2011 | Yoshida | H04N 1/00411 358/1.15 |
| 2011/0279848 A1* | 11/2011 | Watabe | H04N 1/00477 358/1.13 |
| 2013/0057896 A1* | 3/2013 | Ito | H04N 1/00204 358/1.14 |
| 2013/0082662 A1* | 4/2013 | Carre | H02J 7/0052 320/134 |
| 2013/0163035 A1* | 6/2013 | Kamiya | G06F 3/1204 358/1.15 |
| 2013/0301074 A1* | 11/2013 | Yamamoto | H04N 1/00891 358/1.14 |
| 2013/0308150 A1* | 11/2013 | Shinagawa | H04N 1/00209 358/1.13 |
| 2014/0355070 A1* | 12/2014 | Murakawa | H04N 1/00973 358/400 |
| 2015/0002891 A1* | 1/2015 | Kadota | G06F 3/1292 358/1.15 |
| 2015/0105053 A1* | 4/2015 | Ramkumar | H04M 3/436 455/412.1 |
| 2015/0205247 A1* | 7/2015 | Shimizu | G03G 15/80 323/212 |

\* cited by examiner

IMAGE PROCESSING APPARATUS, IMAGE CONTROL METHOD, AND RECORDING MEDIUM STORING IMAGE CONTROL PROGRAM

CROSS-REFERENCE TO RELATED APPLICATION

This patent application is based on and claims priority pursuant to 35 U.S.C. §119 from Japanese Patent Application No. 2014-085367, filed on Apr. 17, 2014 in the Japan Patent Office, which is hereby incorporated by reference herein in its entirety.

BACKGROUND

1. Technical Field

Exemplary embodiments of the present disclosure generally relate to an image processing apparatus, an image control method, and an image control program stored in a non-transitory recording medium.

2. Description of the Related Art

Recently, there are battery-type image processing apparatuses such as printers, multi-functional devices, and scanners that include a battery-type power source unit and perform various operations by employing power supplied from the batter-type power source unit. These battery-type image processing apparatuses are particularly employed at disaster stricken areas where power cannot be stably supplied or developing countries where voltage of power from a power source is unstable.

These battery-type image processing apparatuses are driven by employing the battery-type power source unit and supplying stored power as internal power, or by employing an external power source and supplying power from the external power source as internal power. In the case of employing the external power source, these power-storing type image processing apparatuses recharge a storage battery (e.g., secondary battery such as a lithium ion battery) of the power-storing power source unit using the external power source.

Regarding the above-described power-storing type image processing apparatuses, it is desirable to extend operation time when the above-described power-storing type image processing apparatuses are employing stored power of the power-storing power source unit as internal power.

Power consumption of the battery-type image processing apparatus differs by its functional unit. Power consumption by driving motors of a printing unit is particularly large.

SUMMARY

In view of the foregoing, in an aspect of this disclosure, there is provided a novel image processing apparatus including a facsimile communication unit to transmit or receive facsimile data; a mail communication unit to transmit or receive email data; an outputting unit to output an image of facsimile data received at the facsimile communication unit; an external power source processing unit to operate the image processing apparatus using external power supplied from an external power source; a power-storing source processing unit to operate the image processing apparatus using stored power stored in a power-storing unit; a power source detection unit to detect whether the apparatus is operated with the external power supplied from the external power source or the stored power supplied from the power-storing unit to output a detection result; and a facsimile data output control unit to transmit, when the facsimile communication unit receives facsimile data, the facsimile data to a destination address via e-mail with the mail communication unit based on the detection result indicating that the stored power is supplied, and to output the image of the facsimile data based on the detection result indicating that the external power is supplied.

These and other aspects, features, and advantages will be more fully apparent from the following detailed description of illustrative embodiments, the accompanying drawings, and associated claims.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
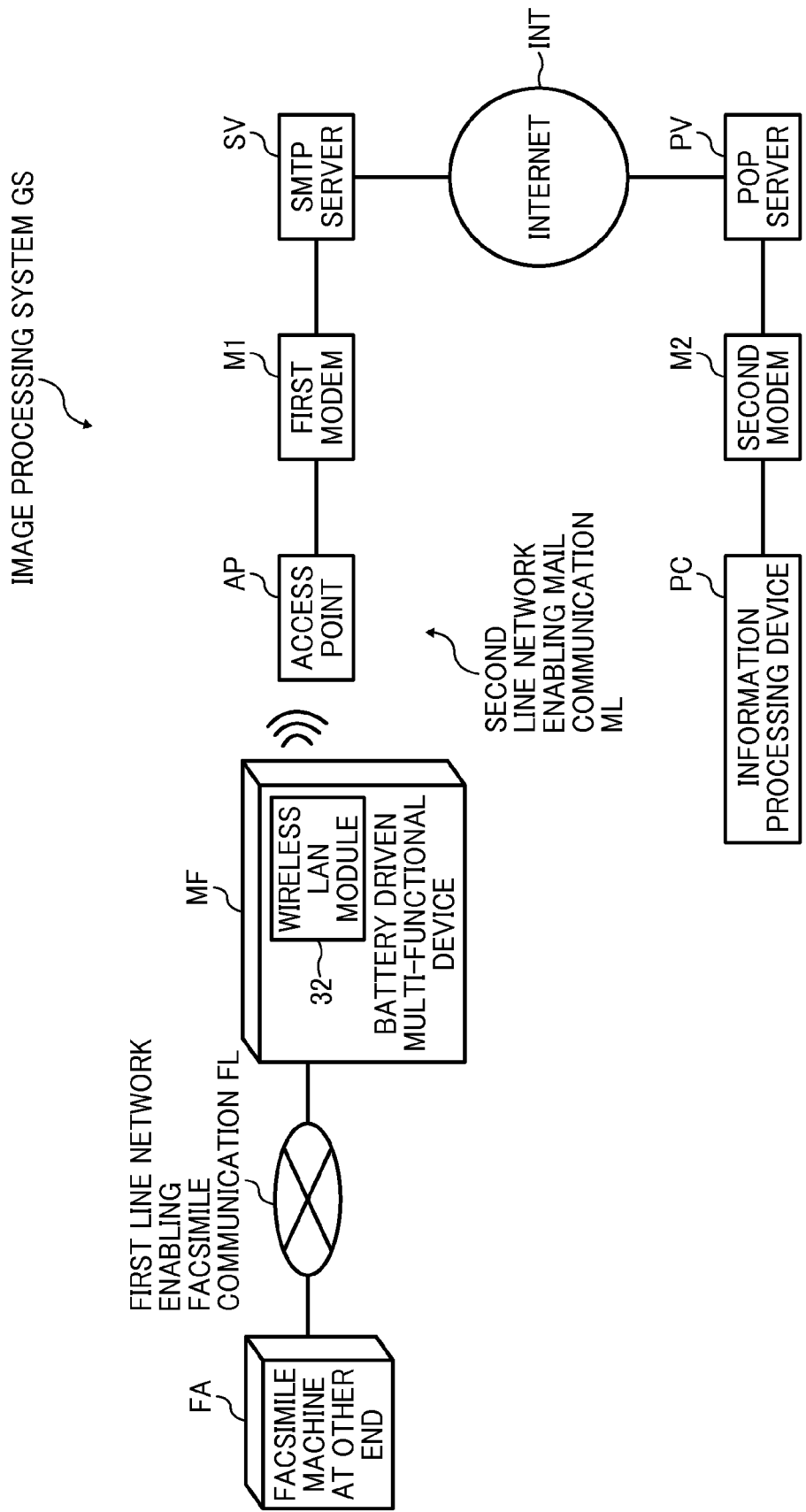
FIG. 1 is a block diagram of a configuration of an image processing system according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

Hereinafter, exemplary embodiments of the present invention are described in detail with reference to the drawings. However, the present invention is not limited to the exemplary embodiments described below, but may be modified and improved within the scope of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

In a later-described comparative example, illustrative embodiment, and alternative example, for the sake of simplicity, the same reference numerals will be given to constituent elements such as parts and elements having the same functions, and redundant descriptions thereof omitted.

There is provided a novel image processing apparatus in which power consumption is effectively reduced when being driven with stored power.

EXAMPLE 1

FIG. 1 to FIG. 9 relate to an image processing apparatus, an image control method, and an image control program according to an embodiment of the present invention of example 1. FIG. 1 is a block diagram of a configuration of an image processing system GS in which the image processing apparatus, the image control method, and the image control program according to the embodiment of the present invention of example 1 is applied.

As shown in FIG. 1, the image processing system GS includes a battery driven multi-functional device MF (i.e., image processing apparatus), a line network FL enabling facsimile communication (hereinafter may be referred to as a first line network FL), and a second line network ML enabling mail communication (hereinafter may be referred to as second line network ML). The battery driven multi-functional device MF is connected to the first line network FL enabling facsimile communication and the second line network ML enabling mail communication. The first line network FL enabling facsimile communication may be implemented by, for example, a public switched telephone network (hereinafter referred to as PSTN) or an integrated services digital network (hereinafter referred to as ISDN). The first line network FL is also connected to other facsimile machines such as a facsimile machine FA as a counterpart for communication with the battery driven multi-functional device MF. The battery driven multi-functional device MF and the facsimile machine FA conducts facsimile communication via the first line network FL.

The second line network ML enabling mail communication is implemented by, for example, a simple mail transport protocol (hereinafter referred to as SMTP) server SV, a point of production (hereinafter referred to as POP) server PV, a first modem M1, a second modem M2, a wireless local area network (hereinafter referred to as LAN) access point AP, and internet INT. The second modem M2 is connected to the POP server PV (i.e., mail server) and an information processing device PC. E-mail communication between the battery driven multi-functional device MF and the information processing device PC is conducted via the second line network ML. More specifically, the battery driven multi-functional device MF includes a wireless LAN module 32. The wireless LAN module 32 (i.e., mail communication unit) conducts communication, such as e-mail communication through the second line network ML, with the wireless LAN access point AP by conducting a wireless communication, for example, in accordance with IEEE802.11. As described above, in example 1, the battery driven multi-functional device MF includes the wireless LAN module 32 to conduct wireless communication to the second line network ML. However, it is to be noted that the battery driven multi-functional device MF may alternatively include a wire-line LAN module connected to the first modem M1 to conduct communication with the second line network ML via wire.

Figure 2:
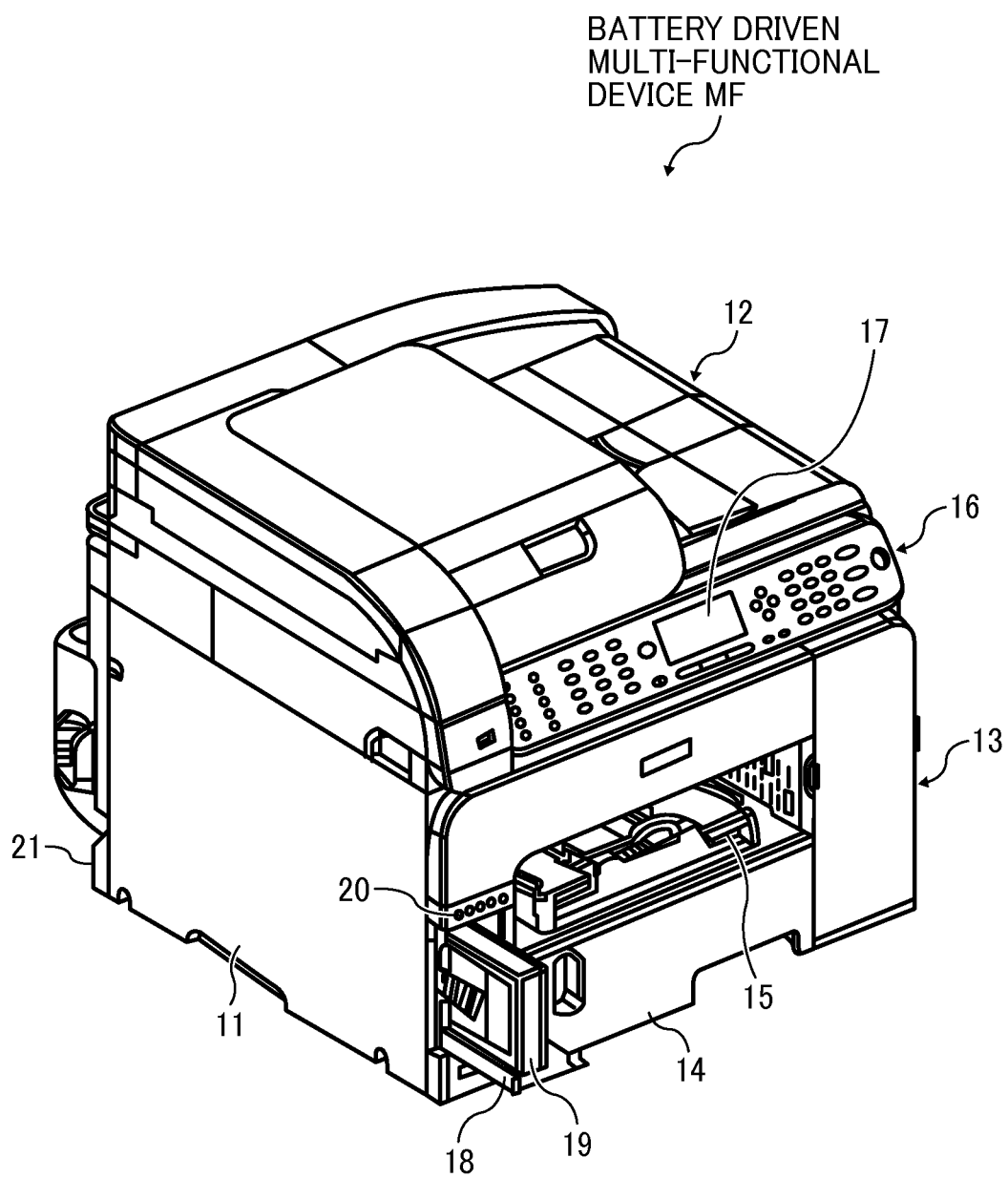
FIG. 2 is a perspective view of a battery driven multi-functional device of FIG. 1.

FIG. 2 is a perspective view of the battery driven multi-functional device MF of example 1. The battery driven multi-functional device MF includes a scanner 12 provided at an upper portion of a main body housing 11. Inside the main body housing 11 of the battery driven multi-functional device MF, a printer 13, a sheet feed unit 14, and a sheet ejection unit 15 are provided. At an upper portion of a front surface of the main body housing 11, an operation panel 16 is provided. The operation display panel 16 includes various keys and a display 17 (i.e., notification unit, display unit).

The scanner 12 employs, for example, a scanner unit using a charge coupled device (hereinafter referred to as CCD) or a complementary metal oxide semiconductor (hereinafter referred to as CMOS) as a photoelectric conversion element. The scanner 12 scans a document into read image data of the document.

Various printing methods may be employed for the printer 13 (i.e., outputting unit). In example 1, the printer 13 is an ink jet printer. The printer 13 includes a carriage 33 (refer to FIG. 3) that reciprocates in a main scanning direction, and a recording head 33a provided in the carriage 33. The recording head 33a includes a formed nozzle array that discharges ink droplets to a sheet serving as a recording medium and forms the image. The printer 13 forms the image on the sheet as follows. Based on image data of the image of the document read by the scanner 12 or image data transmitted from an external terminal such as the information processing device PC via the second line network ML, nozzles of the nozzle array of the recording head 33a are driven by a head driver of the carriage 33. Accordingly, ink droplets are discharged to the sheet and the image is formed on the sheet. The sheet ejection unit 15 ejects the sheet, having the image formed by the printer 13, to an ejection tray.

The battery driven multi-functional device MF also includes a cover 18 that may be opened or closed at the front surface of the main body housing 11. Inside the main body housing 11 covered by the cover 18, a secondary battery unit 19, of a power-storing unit CU, that may be replaced is housed.

At the front surface of the main body housing 11, a remaining-amount displaying unit 20 is provided. The remaining-amount displaying unit 20 may be multiple light emitting diodes (hereinafter referred to as LED) that indicate a remaining amount of power of the secondary battery unit 19 by a number of lighted LEDs. The battery driven multi-functional device MF also includes a connector 21 at a bottom portion of a back surface of the main body housing 11. A plug (i.e., power source connector) of a power cord Lg (Refer to FIG. 4) of an AC adapter AE, described later, is inserted into the connector 21.

Figure 3:
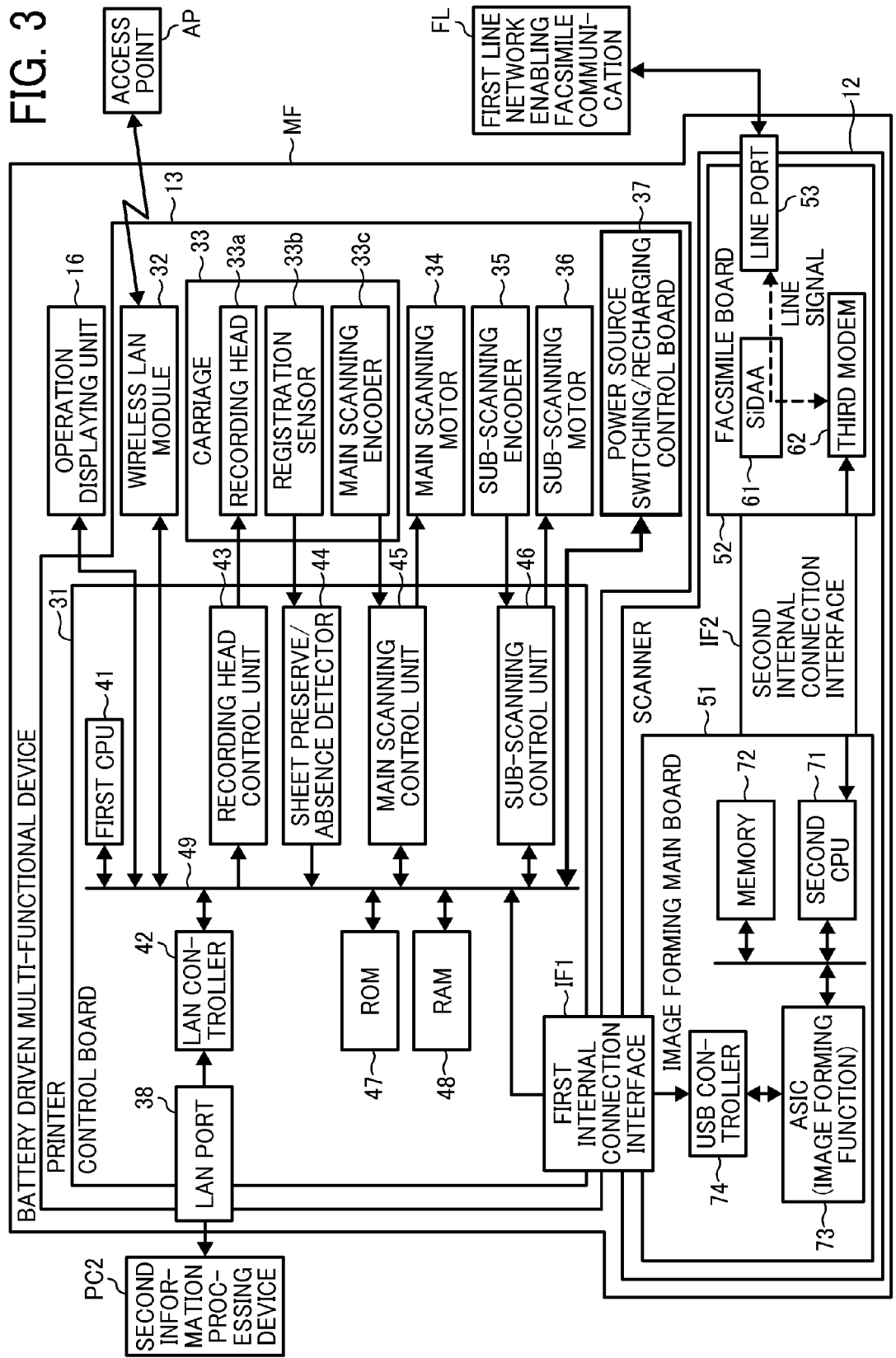
FIG. 3 is a block diagram of a configuration of the battery driven multi-functional device.

FIG. 3 is a block diagram of a configuration of the battery driven multi-functional device MF. As shown in FIG. 3, the battery driven multi-functional device MF includes the printer 13, the scanner 12, and the above-described operation display panel 16.

The printer 13 includes a control board 31, the wireless LAN module 32, the carriage 33, a main scanning motor 34, a sub-scanning encoder 35, a sub-scanning motor 36, a power source switching/recharging control board 37, and a LAN port 38. The control board 31 includes a first central processing unit 41 (hereinafter referred to as CPU), a LAN controller 42, a recording head control unit 43, a sheet presence/absence detector 44, a main scanning control unit 45, a sub-scanning control unit 46, a read only memory 47 (hereinafter referred to as ROM), and a random access memory 48 (hereinafter referred to as RAM). The above-described units 41 to 48 are connected to a bus 49. The carriage 33 includes the recording head 33a, a registration sensor 33b, and a main scanning encoder 33c.

The recording head 33a forms, as described above, the image on the sheet by discharging ink droplets to the sheet by driving the nozzles of the nozzle array under control of the recording head control unit 43 of the control board 31.

The registration sensor 33b detects a front edge of the sheet that is conveyed from the sheet feed unit 14 to a registration roller that is provided along the sheet conveyance path of the printer 13 and prior to a position of printing by the recording head 33a. The registration sensor 33b outputs a detection result of the detection to the sheet presence/absence detector 44. The registration sensor 33b may be, for example, a reflection type or a transparent type photocoupler.

The rotational drive of the main scanning motor 34 causes the carriage 33 reciprocate in the main scanning direction.

The main scanning encoder 33c detects a position of the moved carriage 33, and outputs a detection result of the detection to the main scanning control unit 45.

The rotational drive of the sub-scanning motor 36 moves a conveyance roller, which rotationally drives a conveyance belt to convey the sheet, in a sub-scanning direction. The sub-scanning encoder 35 detects a rotational position of the conveyance roller. More specifically, the sub-scanning encoder 35 detects a conveyance position of the sheet.

Figure 4:
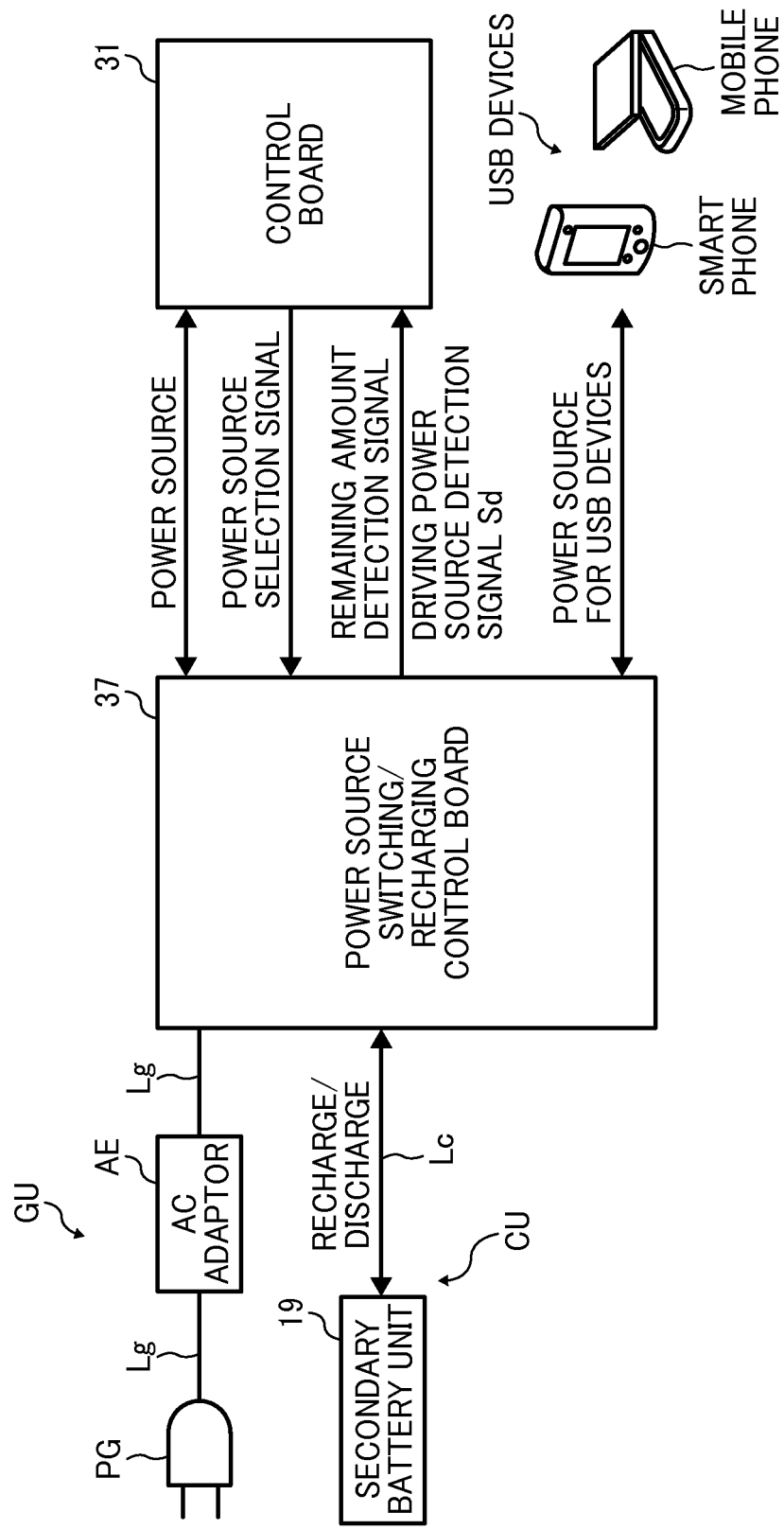
FIG. 4 is a block diagram of a configuration of a circuit for a power source switching/recharging control board of the battery driven multi-functional device.

The power source switching/recharging control board 37, as shown in FIG. 4, is connected to the control board 31, an external power source connection unit GU, and the power-storing unit CU. The external power source connection unit GU includes the AC adapter AE, the power cord Lg, and a power source plug PG. By inserting the power source plug PG to a power receptacle, of AC100V, of a commercial power source serving as an external power source, external power is supplied to the power source switching/recharging control board 37. The external power source connection unit GU may be connected to or disconnected from the power source switching/recharging control board 37 by connecting or disconnecting the power source connector, of the power cord Lg, of the AC adapter AE at the power source switching/recharging control board 37 side, and inserting or unplugging the power source plug PG from the power receptacle.

The power-storing unit CU includes the secondary battery unit 19 and a second power cord Lc. The secondary battery unit 19 includes a secondary battery, such as a lithium ion battery, that discharges stored power and may be recharged. The power-storing unit CU supplies stored power of the secondary battery unit 19 to the power source switching/recharging control board 37.

The power source switching/recharging control board 37 includes a power source detector (i.e., power source detection unit) that conducts power source detection processes. More specifically, the power source detector detects whether internal power is supplied from external power (i.e., detects whether or not the external power source connection unit GU is connected) or supplied from stored power. The power source switching/recharging control board 37 also includes an external power processing unit (i.e., external power source processing unit) that conducts processing of external power from the external power source connection unit GU to be employed as internal power for the battery driven multi-functional device MF. Further, the power source switching/recharging control board 37 includes a stored power processing unit (i.e., power-storing source processing unit) that conducts processing of stored power from the secondary battery unit 19 of the power-storing unit CU to be employed as internal power for the battery driven multi-functional device MF. In addition, the power source switching/recharging control board 37 includes a battery remaining-amount detection unit that detects a remaining amount of power of the secondary battery unit 19, and a recharging unit that recharges the secondary battery unit 19 by generating recharging power for the secondary battery unit 19 with the external power source.

The power source switching/recharging control board 37 outputs a detection result of the above-described power source detector as a driving power source detection signal Sd to the control board 31, and outputs a detection result of the above-described battery remaining-amount detection unit as a remaining-amount detection signal to the control board 31. The power source detector outputs a low driving power source detection signal Sd to the control board 31 when internal power is external power supplied from the external power source. The power source detector outputs a high driving power source detection signal Sd to the control board 31 when internal power is supplied by stored power.

When the power source detector detects power being supplied from the external power source, the power source switching/recharging control board 37 basically employs the external power source as the power supplying source and supplies internal power with the external power source. In addition, the power source switching/recharging control board 37 supplies recharging power with the recharging unit and recharges the secondary battery of the secondary battery unit 19 when power is supplied from the external power source.

When a power source selection signal that specifies stored power is inputted to the power source switching/recharging control board 37 from the control board 31, stored power is supplied as internal power even when power is being supplied from the external power source.

When a power switch of the battery driven multi-functional device MF is OFF or when the battery driven multi-functional device MF is in a power conservation mode that reduces or stops power supply to main parts of the battery driven multi-functional device MF, the power source switching/recharging control board 37 basically supplies power from the external power source to recharge the secondary battery of the secondary battery unit 19. When the battery driven multi-functional device MF is in a standby mode, the power source switching/recharging control board 37 does not recharge the secondary battery, but supplies internal power from power of the external power source, and supplies internal power to various parts of the battery driven multi-functional device MF.

Thus, the power source switching/recharging control board 37 functions as the external power source processing unit, the power-storing source processing unit, and the power source detection unit.

It is to be noted that the power source switching/recharging control board 37 also supplies power for universal serial bus (hereinafter referred to as USB) devices from supplied internal power and includes a USB power source connector to supply power to USB devices such as a smart phone or a mobile phone.

Returning to FIG. 3, the ROM 47 of the control board 31 stores a basic program for the battery driven multi-functional device MF, system data and the image control program according to the embodiment of the present invention, and data for an image control process of example 1.

Based on programs in the ROM 47, the first CPU 41 controls each part of the battery driven multi-functional device MF, for example, to execute basic processing of the battery driven multi-functional device MF, and execute image control processing according to the embodiment of the present invention. Further, the first CPU 41 conducts, employing the RAM 48, image processing necessary for transmitting data received by facsimile (hereinafter may be referred to as facsimile data) via e-mail to the predetermined information processing device PC. More specifically, the first CPU 41 conducts, based on the driving power source detection signal Sd from the power source switching/recharging control board 37, facsimile data output control processing to control transfer of the facsimile data to the information processing device PC, via e-mail, as a part of the image control process described later. Thus, the first CPU 41 functions as a facsimile data output control unit.

The LAN controller 42 is connected to the LAN port 38. The LAN port 38 is connected to a network such as a LAN connected to a second information processing device PC2 or other information processing devices. Under control of the first CPU 41, the LAN controller 42 communicates with, for example, the second information processing device PC2 connected to the network.

The recording head control unit 43 is connected to the recording head 33a of the carriage 33. Under control of the first CPU 41, the recording head control unit 43 controls ink ejection from each nozzle by controlling drive of the recording head 33a.

The sheet presence/absence detector 44 determines a presence or an absence of the sheet conveyed to the registration roller according to a sheet detection signal from the registration sensor 33b of the carriage 33, and outputs a determination result to the first CPU 41. Based on the detection result of the registration sensor 33b, the first CPU 41 controls image formation on the sheet by controlling drive of the recording head 33a with the recording head control unit 43, the main scanning motor 34, and the sub-scanning motor 36.

The main scanning control unit 45 outputs the detection result inputted from the main scanning encoder 33c to the first CPU 41. Based on the detection results from the main scanning encoder 33c, the first CPU 41 determines the position of the carriage 33 and conducts movement control of the carriage 33 by driving the main scanning motor 33c via the main scanning control unit 45.

The sub-scanning control unit 46 outputs a detection result inputted from the sub-scanning encoder 35 to the first CPU 41. Based on the detection results from the sub-scanning encoder 35, the first CPU 41 controls the conveyance belt. More specifically, the first CPU 41 controls conveyance of the sheet.

The scanner 12 includes an image forming main board 51, a facsimile board 52, and a line port 53. The image forming main board 51 of the scanner 12 is connected to the control board 31 of the printer 13 with a first internal connection interface IF1. Further, the image forming main board 51 is connected to the facsimile board 52 with an appropriate second internal connection interface IF2. In example 1, the first internal connection interface IF1 is an USB.

The line port 53 is connected to the above-described first line network FL, and is a communication port with respect to the facsimile machine FA serving as the counterpart for communication connected to the first line network FL.

The facsimile board 52 (i.e., facsimile communication unit) conducts facsimile communication, and includes a silicon data access arrangement 61 (hereinafter referred to as SiDAA) and a third modem 62.

The SiDAA 61 is connected to the line port 53 and the third modem 62, and is an interface of the third modem 62 and the first line network FL connected to the line port 53. The SiDAA 61 conducts detection of an open-loop/closed-loop state of a line, detection of a call signal (i.e., linking detection), conducts analog-to-digital (hereinafter referred to as AD)/digital-to-analog (hereinafter referred to as DA) conversion, and outputs the detection results to the third modem 62 and the image forming main board 51 via the second internal connection interface IF2.

The third modem 62 modulates digital data that is to be transmitted to the first line network FL via the SiDAA 61 to an analog signal, or demodulates an analog signal received from the first line network FL via the SiDAA 61 to digital data.

The image forming main board 51 includes a second CPU 71, a memory 72, an application specific integrated circuit 73 (hereinafter referred to as ASIC), and a USB controller 74. The image forming main board 51 conducts facsimile communication control and image data processing in facsimile communication. It is to be noted that although FIG. 3 does not show the above-described scanner unit to read the image of the document, the scanner 12 includes the above-described scanner unit.

The memory 72 stores a basic program of the scanner 12, programs, out of the image control programs according to the embodiment of the present invention, which are to be conducted by the scanner 12, and other data.

Based on programs in the memory 72, the second CPU 71 conducts basic processing of the scanner 12 and executes image control processing according to the embodiment of the present invention.

The ASIC 73 conducts image processing that causes the image data of the image of the document read by the scanner unit of the scanner 12 into image data that is compatible to facsimile transmission. The ASIC 73 also conducts image processing that causes the image data of the image of the document read by the scanner 12 into image data, which may be processed by the printer 13, and transfers the processed image data to the USB controller 74. Further, the ASIC 73 receives the facsimile-received data from the facsimile board 52, conducts image processing with respect to the facsimile-received data, and transfers the processed facsimile-received data to the USB controller 74.

The USB controller 74 transfers signals and data to the first CPU 41 of the control board 31 via the first internal connection interface IF1. Particularly, the USB controller 74 transfers the image data (e.g., the image data of the image of the document read by the scanner unit, or the facsimile-received data) received from the ASIC 73 to the first CPU 41 of the control board 31 via the first internal connection interface IF1.

When the first CPU 41, in a copy mode, of the control board 31 receives the image data from the scanner 12, the first CPU 41 conducts various image processing with respect to the received image data that is necessary for image formation on the sheet by employing the RAM 48. After the various image processing, the first CPU 41 drives the carriage 33.

When the first CPU 41, in a facsimile receiving mode, receives the image data (e.g., facsimile data) from the scanner 12, the first CPU 41 switches processing between image forming output to the sheet at the printer 13 and e-mail transmission based on the driving power source detection signal Sd from the power source switching/recharging control board 37.

By reading the image control program that executes the image control method according to the embodiment of the present invention recorded on a computer readable recording medium into the ROM 47 or memory 72, a configuration in which the battery driven multi-functional device MF (i.e., image processing apparatus) executes the image control method that effectively reduces power consumption when driven with stored power is obtained. Specific examples of the computer readable recording medium include, but are not limited to, a ROM, an electrically erasable and programmable read only memory (hereinafter referred to as EEPROM), a flash memory, a flexible disk, a compact disc read only memory (hereinafter referred to as CD-ROM), a compact disc rewritable (hereinafter referred to as CD-RW), a digital versatile disk (hereinafter referred to as DVD), a secure digital (hereinafter referred to as SD) card, and a magneto-optical disc (hereinafter referred to as MO). The image control program is a computer executable program written in an object-oriented programming language or a legacy programming language, and can be stored in the above-described computer readable recording medium and distributed. Specific examples of the legacy programming language include, but are not limited to, assembler, C, C++, C#, and Java (Registered Trademark).

The following is a description of operation of example 1. The battery driven multi-functional device MF of example 1 effectively reduces power consumption when driven with stored power.

More specifically, as shown in FIG. 4, the external power source connection unit GU and the power-storing unit CU is connected to the power source switching/recharging control board 37. The external power source connection unit GU is detachably attached. The power-storing unit CU includes the secondary battery unit 19 and supplies stored power of the secondary battery unit 19 to the power source switching/recharging control board 37. By discharging stored power of the secondary battery unit 19 and supplying discharged stored power to drive the battery driven multi-functional device MF, stored power of the secondary battery unit 19 is consumed. Particularly, large consumption of stored power occurs when image forming is performed using the printer 13 that drives the main scanning motor 34 and the sub-scanning motor 36.

Figure 5:
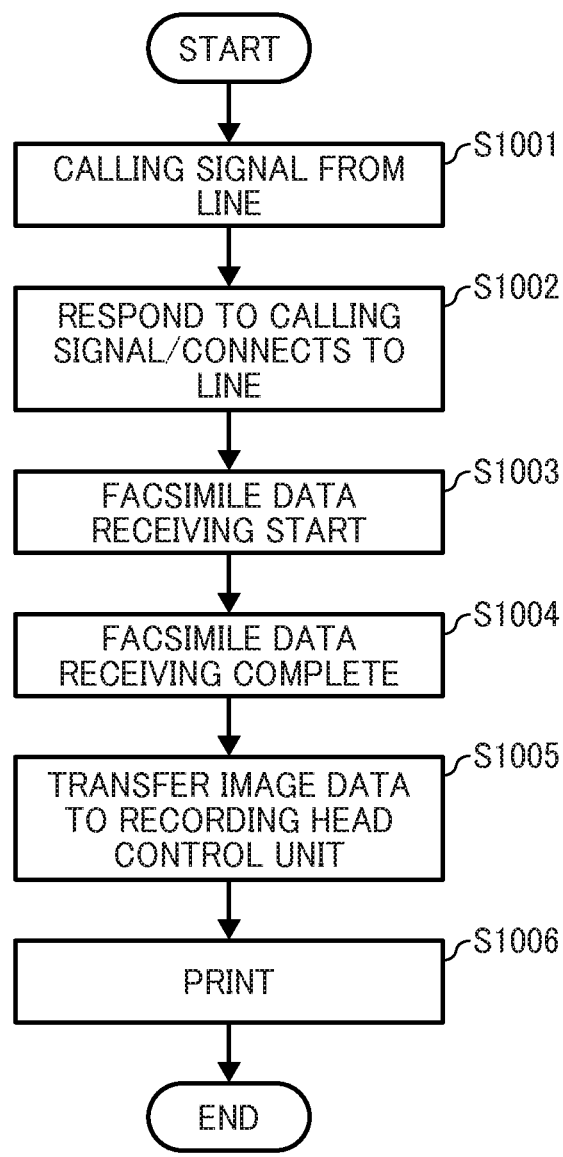
FIG. 5 is a flowchart illustrating operation of receiving facsimile.

When the battery driven multi-functional device MF is in the copy mode or a print mode, driving the printer 13 is necessary. However, when the battery driven multi-functional device MF is in the facsimile receiving mode, processing can be conducted without driving the printer 13. More specifically, in the facsimile receiving mode, by transmitting e-mail to the information processing device PC serving as the external terminal without outputting a record of the facsimile-received data at the printer 13, power consumption can be reduced. The following is a description of an example of a typical facsimile receiving process. As shown in FIG. 5, in step S1001, there is the call signal from the first line network FL. In step S1002, there is a response to the call signal and connection to a line is established. After preparation for receiving a facsimile is completed, in step S1003, receiving of the facsimile data (e.g., image data) from the line is started. When receiving of all of the facsimile data is complete, facsimile communication is ended in step S1004. Then, in step S1005, a non-image processing signal is transferred to the recording head control unit 43 of the printer 13. In step S1006, at the printer 13, the image is formed and outputted to the sheet based on the facsimile data.

Accordingly, when facsimile receiving in the battery driven multi-functional device MF is always the above-described typical facsimile receiving process, there is a need to drive motors at the printer 13 to output the record of the facsimile data on the sheet. Accordingly, large power consumption occurs.

The power source switching/recharging control board 37 of the battery driven multi-functional device MF of example 1 includes the power source detector to detect whether or not the external power source connection unit GU is connected. More specifically, the power source detector detects whether or not the external power source connection unit GU is connected, and checks whether or not the external power source connection unit GU is connected with the power source selection signal from the control board 31. The power source detector outputs the low driving power source detection signal Sd to the control board 31 when internal power supplied to various parts of the battery driven multi-functional device MF is external power supplied from the external power source connection unit GU. The power source detector outputs the high driving power source detection signal Sd to the control board 31 when internal power is supplied by stored power.

Figure 6:
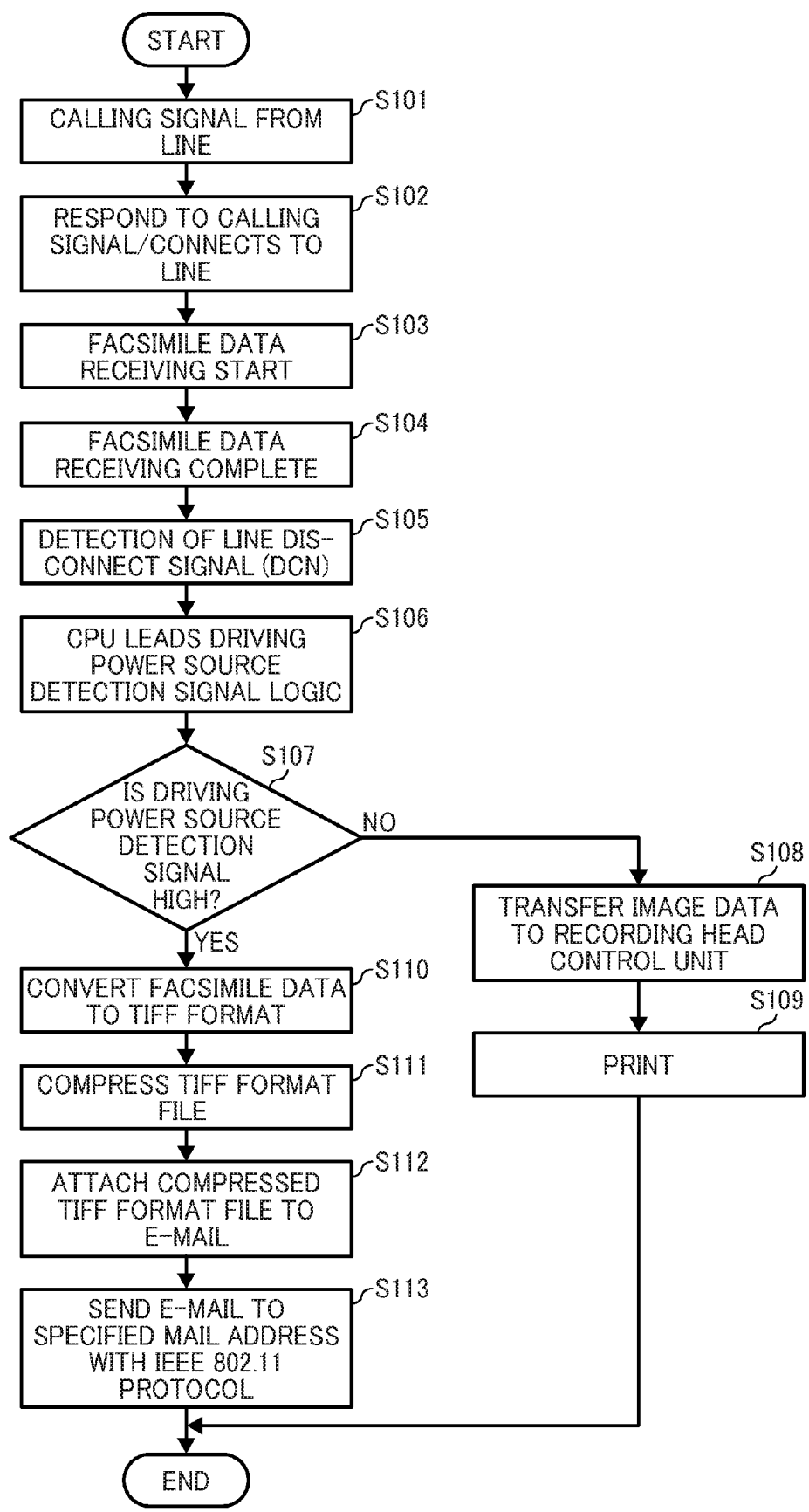
FIG. 6 is a flowchart illustrating operation of processing an image performed by the battery driven multi-functional device when receiving facsimile.

The following is a description of an example of a facsimile receiving process of the battery driven multi-functional device MF based on the driving power source detection signal Sd. As shown in FIG. 6, based on the driving power source detection signal Sd, the image control process that switches processing between outputting the record of the facsimile-received data at the printer 13 and e-mail transferring to the information processing device PC is conducted.

More specifically, in step S101, there is the call signal from the first line network FL (i.e., a line). In step S102, the SiDAA 61 responds to the call signal and connection to the line is established.

In step S103, receiving of the facsimile data from the facsimile machine FA serving as the counterpart for communication is started by the facsimile board 52. All facsimile data is received in step S104. Then, when a disconnect (hereinafter referred to as DCN) signal is received from the facsimile machine FA serving as the counterpart for communication, the facsimile board 52 ends facsimile communication in step S105. After the facsimile communication is ended, in step S106, the first CPU 41 reads a logic of the driving power source detection signal Sd from the power source switching/recharging control board 37. In step S107, the first CPU 41 checks whether or not the driving power source detection signal Sd is high.

When the driving power source detection signal Sd is low (i.e., corresponds to NO) in step S107, the first CPU 41 converts, employing the RAM 48, the facsimile-received data to image data that is appropriate for output with the printer 13 and, in step S108, transfers the image data to the recording head control unit 43. In step S109, the first CPU 41 conducts printing of the image onto the sheet by controlling drive of the recording head 33a of the carriage 33 with the recording head control unit 43 and controlling drive of the main scanning motor 34 and the sub-scanning motor 36, and ends the image control process.

When the driving power source detection signal Sd is high (i.e., corresponds to YES) in step S107, the first CPU 41 converts the facsimile data to a file with a file format (e.g., Tiff format) compatible to e-mail transmission in step S110.

In step S111, the file is compressed with an appropriate compression format (e.g., MH format, MR format, MMR format, etc.). In step S112, the compressed file is attached to an e-mail.

Then, in step S113, the first CPU 41 transmits the e-mail with the attachment of the compressed file to a predetermined mail address via the second line network ML, and ends the image control process. More specifically, when transmitting the e-mail with the attachment of the compressed file, the first CPU 41 employs a wireless LAN protocol (e.g., IEEE802.11) and transmits the e-mail with the attachment of the compressed file to the access point AP of the second line network ML from the wireless LAN module 32. The second line network ML eventually stores the e-mail with the attachment of the compressed file in the POP server PV. The POP server PV notifies receival of the e-mail with the attachment of the compressed file via the second modem M2 to the information processing device PC that is, in example 1, the predetermined mail address. Accordingly, the information processing device PC receives the e-mail with the attachment of the compressed file from the POP server PV.

According to a user instruction, the information processing device PC may extract and decompress the attached and compressed file of the e-mail transmitted to the information processing device PC, and output a print out of the decompressed file with a printing device or the like connected to the information processing device PC. Thus, output of the record of the facsimile data is achieved.

Figure 7:
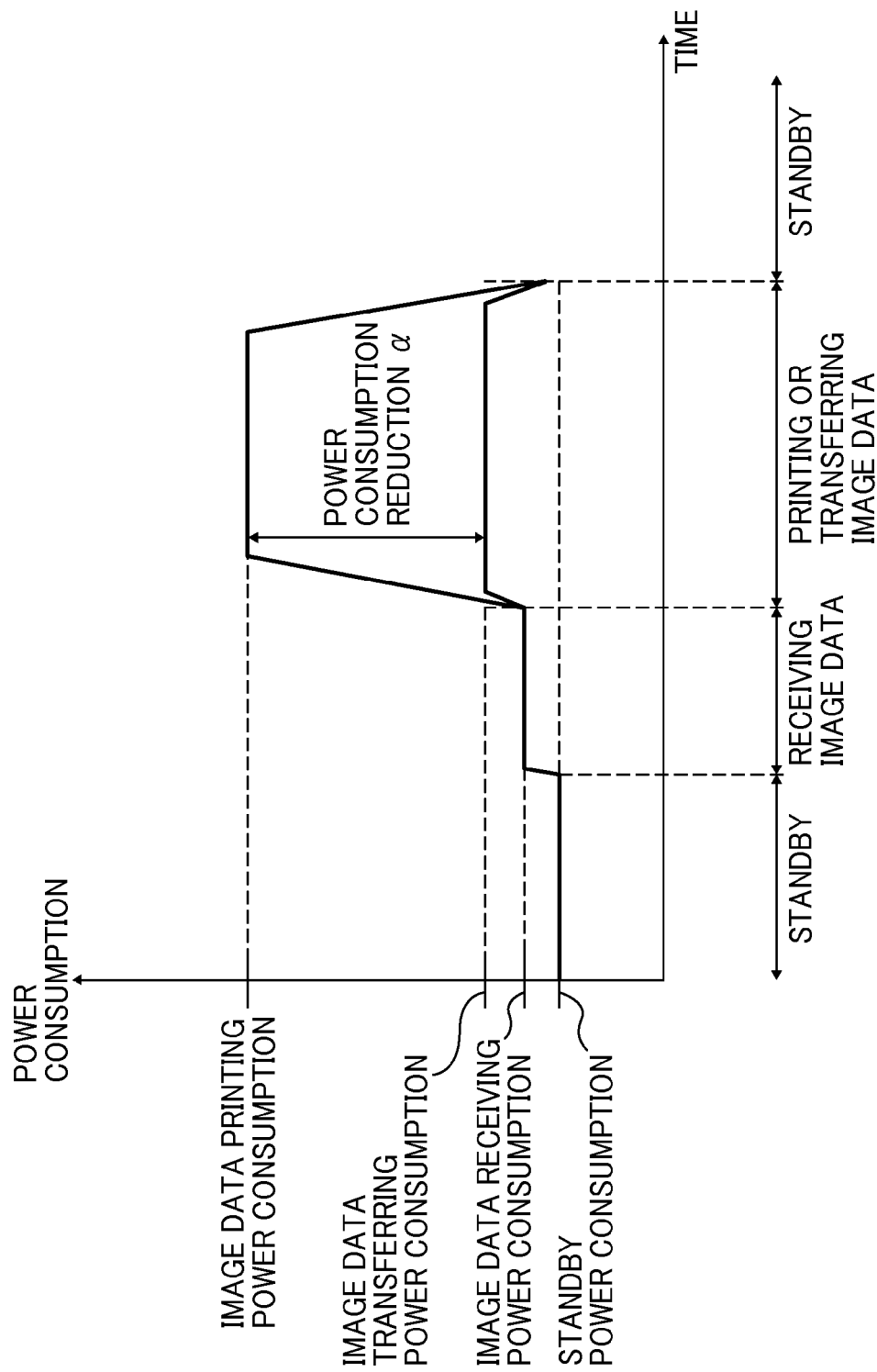
FIG. 7 is a graph showing reduction of power consumption at data transfer.

As shown in FIG. 7, when the battery driven multi-functional device MF switches from a state of standby to a state of receiving the facsimile data, increase of power consumption occurs. When the battery driven multi-functional device MF transfers the facsimile data as e-mail, power consumption with respect to e-mail transfer occurs though, as shown by arrow α in FIG. 7, power consumption is substantially reduced compared to power consumption with respect to printing. More specifically, the battery driven multi-functional device MF transfers the facsimile data as e-mail to the information processing device PC without driving the main scanning motor 34 or the sub-scanning motor 36 that consume a large amount of power. By printing at the information processing device PC, power consumption at the battery driven multi-functional device MF can be reduced.

Figure 8:
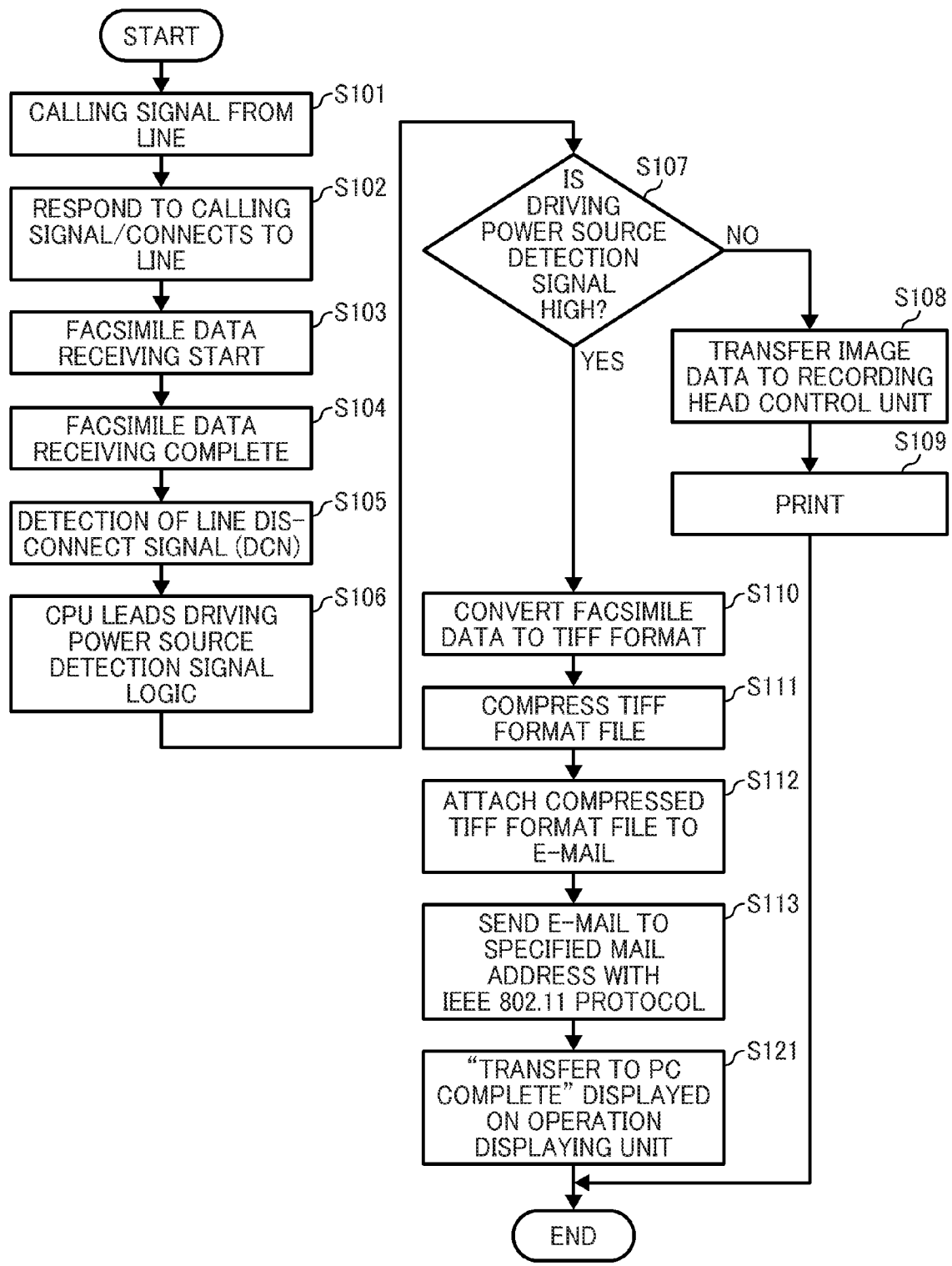
FIG. 8 is a flow chart of an image control process of the battery driven multi-functional device that is reported on an operation display panel when transferring the received facsimile.
Figure 9:
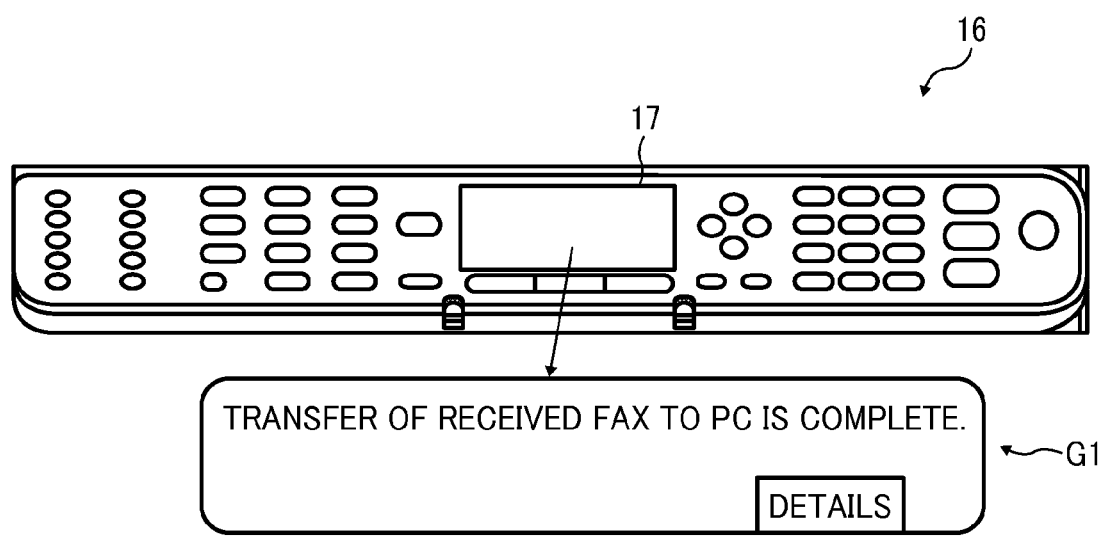
FIG. 9 is a plan view of the operation display panel.

It is to be noted that the above-described image control process of the battery driven multi-functional device MF may further include, as shown in FIG. 8 and FIG. 9, step S121 that notifies transfer of the facsimile-received data to the information processing device PC by displaying a message on the display 17 of the operation display panel 16. Regarding the following description of FIG. 8, detailed descriptions of processes that are the same as FIG. 6 with the same numbers are omitted.

First, the battery driven multi-functional device MF conducts the image control process as described in FIG. 6. When the driving power source detection signal Sd is high, the facsimile data is converted into the file with the appropriate file format (e.g., Tiff format), the file is compressed, and transmission of the e-mail with the attachment of the compressed file to the predetermined mail address is conducted (i.e., steps S101 to S107, and S110 to S113). Then in step S121, when the battery driven multi-functional device MF transfers the e-mail with the attachment of the compressed file (i.e., compressed facsimile data) to the information processing device PC, the message that notifies transfer is displayed on the display 17 of the operation display panel 16. The message may be "Transfer of received FAX to PC completed" indicated on a notification screen G1 as shown in FIG. 9.

By notifying the user of transfer of the facsimile-received data to the information processing device PC, operability is enhanced.

As described above, in the image processing system GS of example 1, the battery driven multi-functional device MF includes the facsimile board 52 (i.e., facsimile communication unit) to conduct facsimile communication; the wireless LAN module 32 (i.e., mail communication unit) that conducts e-mail communication; the printer 13 (i.e., outputting unit) to output the record of the facsimile-received data received by the wireless LAN module 32 to the sheet (i.e., recording medium); the external power source processing unit of the power source switching/recharging control board 37 to supply internal power of the battery driven multi-functional device MF from external power supplied from the external power source; the secondary battery unit 19 (i.e., power storing unit) to store power; the power-storing source processing unit of the power source switching/recharging control board 37 to supply internal power of the battery driven multi-functional device MF from stored power in the secondary battery unit 19; the power source detection unit of the power source switching/recharging control board 37 to detect whether internal power is supplied from external power or supplied from stored power; and the first CPU 41 (i.e., facsimile data output control unit) to transmit the facsimile-received data to the predetermined email address with the wireless LAN module 32 when the facsimile board 52 receives the facsimile-received data and a detection result of the power source detection unit of the power source switching/recharging control board 37 is stored power, and to conduct output of the record of the facsimile-received data when the facsimile board 52 receives the facsimile-received data and a detection result of the power source detection unit of the power source switching/recharging control board 37 is external power.

Thus, when the battery driven multi-functional device MF is operating with stored power, the facsimile-received data is transmitted to other devices via e-mail and large power consumption due to driving the printer 13 may be omitted. As a result, power consumption is effectively reduced when being driven with stored power.

In addition, the image processing system GS of example 1 executes the image control method that includes a facsimile communication step to conduct facsimile communication; a mail communication step to conduct e-mail communication; an outputting step that outputs, onto the sheet, the image of the facsimile-received data received in the facsimile communication step; an external power source processing step to supply internal power of the battery driven multi-functional device MF from external power supplied from the external power source; a power-storing source processing step to supply internal power of the battery driven multi-functional device MF from stored power in the secondary battery unit 19 (i.e., power storing unit) that stores power; a power source detection step to detect whether internal power is supplied from external power or supplied from stored power; and a facsimile data output control step to transmit the facsimile-received data to the predetermined mail address with the mail communication step when the facsimile-received data is received and a detection result of the power source detection step is stored power, and to conduct output of the image of the facsimile-received data with the outputting step when the facsimile-received data is received and a detection result of the power source detection step is external power.

Thus, when the battery driven multi-functional device MF is operating with stored power, the facsimile-received data is transmitted to other devices via e-mail and large power consumption due to driving the printer 13 may be omitted. As a result, power consumption is effectively reduced when being driven with stored power.

Further, the image processing system GS of example 1 includes the image control program that causes a control processor such as the first CPU 41 of the battery driven multi-functional device MF execute a facsimile communication process to conduct facsimile communication; a mail communication process to conduct e-mail communication; a recording process that outputs, onto the sheet (i.e., recording medium), the record of the facsimile-received data received in the facsimile communication process; an external power source process to supply internal power of the battery driven multi-functional device MF from external power supplied from the external power source; a power-storing source process to supply internal power of the battery driven multi-functional device MF from stored power in the secondary battery unit 19 that stores power; a power source detection process to detect whether internal power is supplied from external power or supplied from stored power; and a facsimile data output control process to transmit the facsimile-received data to the predetermined mail address with the mail communication process when the facsimile-received data is received and the detection result of the power source detection process is stored power, and to conduct output of the record of the facsimile-received data with the recording process when the facsimile-received data is received and the detection result of the power source detection process is external power.

Thus, when the battery driven multi-functional device MF is operating with stored power, the facsimile-received data is transmitted to other devices via e-mail and large power consumption due to driving the printer 13 may be omitted. As a result, power consumption is effectively reduced when being driven with stored power.

The battery driven multi-functional device MF further includes the display 17 (i.e., notification unit) of the operation display panel 16 to output notification information. The first CPU 41 (i.e., facsimile data output control unit) outputs and informs, on the display 17, of e-mail transmission of the facsimile-received data when the facsimile board 52 transmits the facsimile-received data to the predetermined mail address.

Thus, the user is informed of e-mail transmission of the facsimile-received data by information displayed on the display 17 of the battery driven multi-functional device MF, and operability is enhanced while reducing power consumption.

The notification unit is, for example, the display 17 (display unit) that displays information.

Thus, the user is informed of e-mail transmission of the facsimile-received data by information displayed on the display 17 of the battery driven multi-functional device MF, and operability is enhanced while reducing power consumption.

EXAMPLE 2

Figure 10:
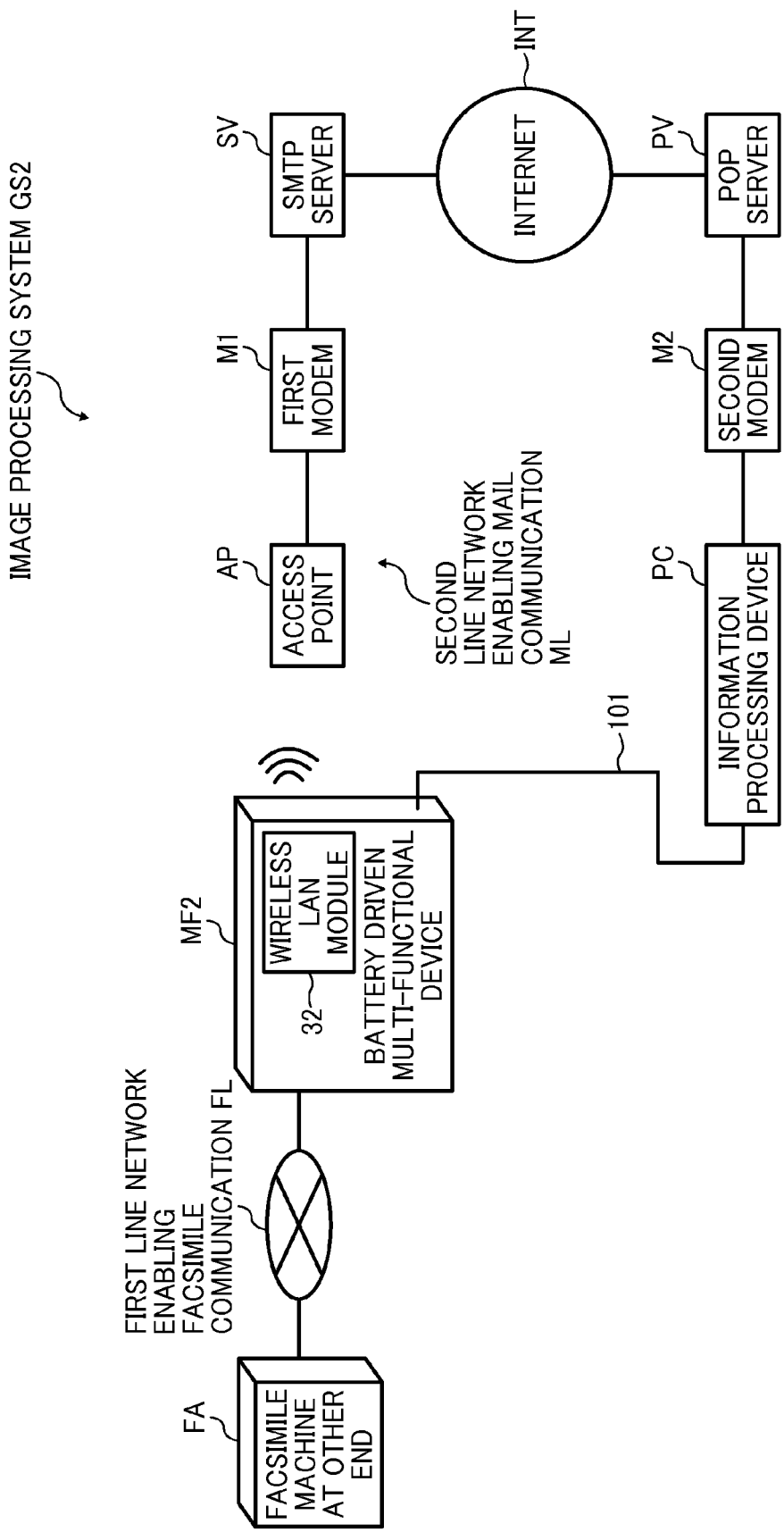
FIG. 10 is a block diagram of a configuration of an image processing system of example 2.
Figure 11:
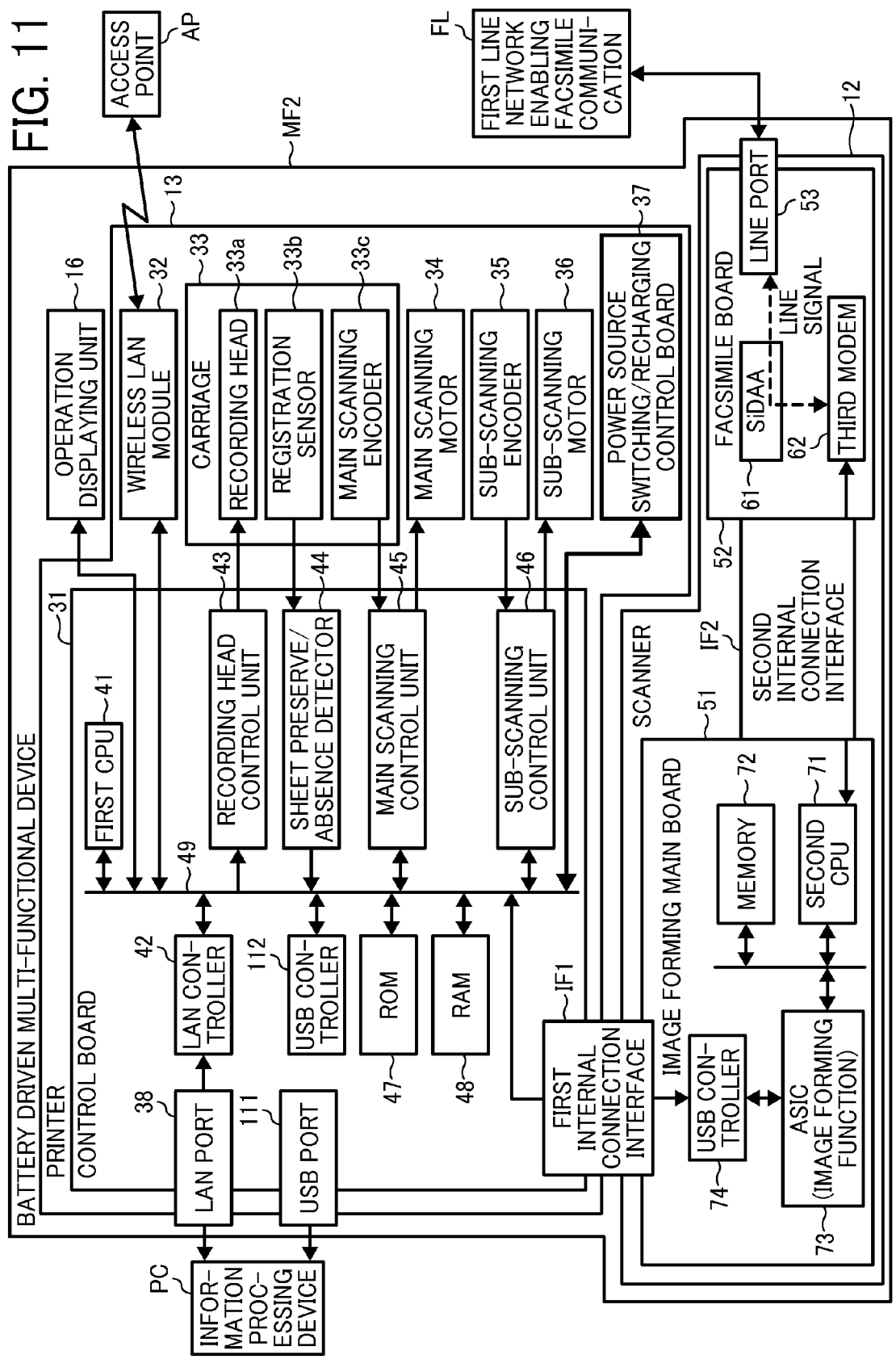
FIG. 11 is a block diagram of a configuration of a battery driven multi-functional device of FIG. 10.
Figure 12:
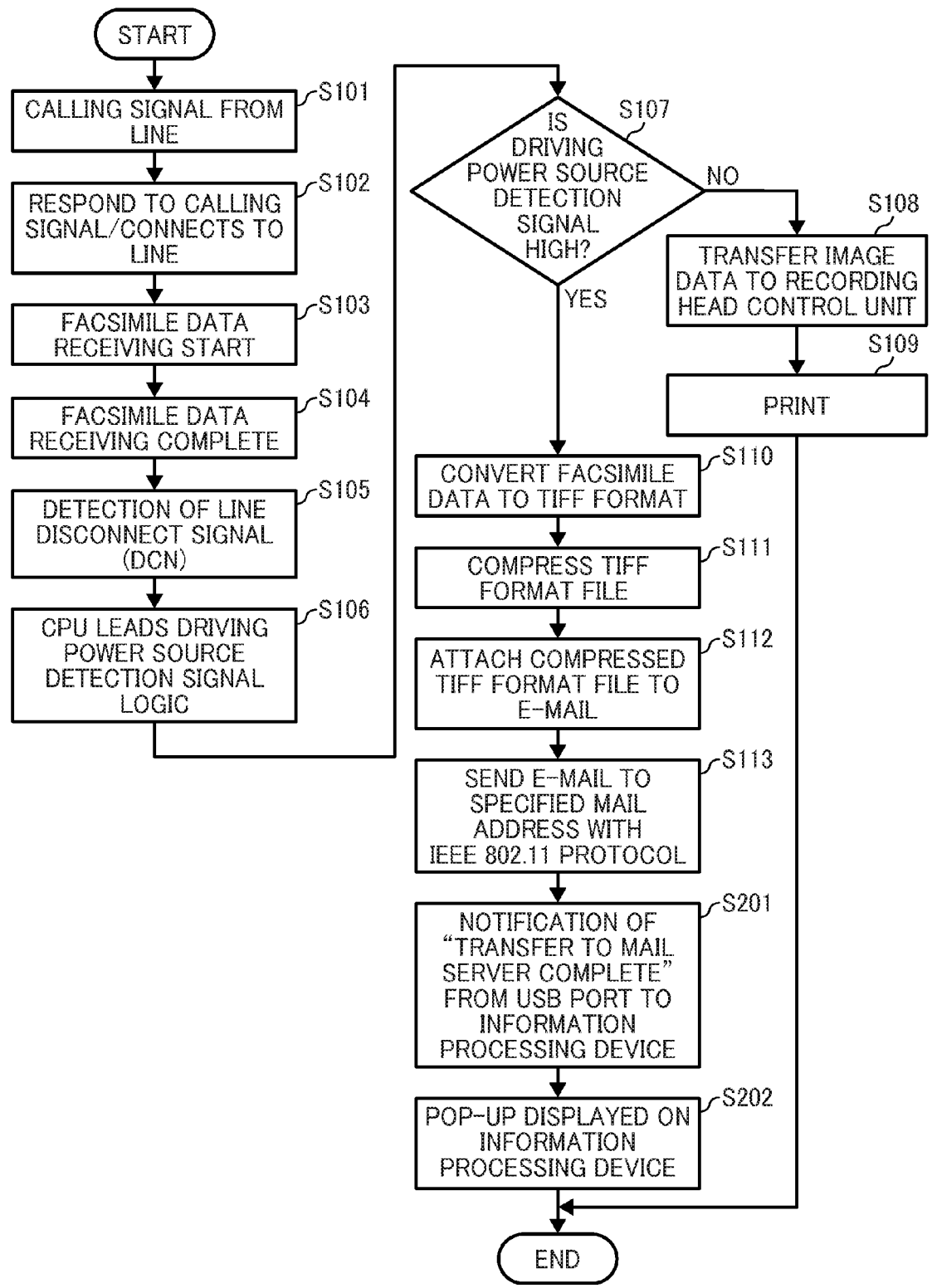
FIG. 12 is a flow chart of an image control process of the battery driven multi-functional device of FIG. 10 when receiving a facsimile.

FIG. 10 to FIG. 12 relate to an image processing apparatus, an image control method, and an image control program according to example 2. FIG. 10 is a block diagram of a configuration of an image processing system GS2 in which the image processing apparatus, the image control method, and the image control program according to example 2 is applied.

It is to be noted that in the following description of the image processing system GS2 of example 2, for the sake of simplicity, the same reference numerals will be given to constituent elements such as parts and elements having the same functions as the image processing system GS of example 1, and redundant descriptions thereof omitted.

As shown in FIG. 10, the image processing system GS2 includes a battery driven multi-functional device MF2 that is, like the battery driven multi-functional device MF of example 1, connected to a second line network ML enabling mail communication, connected to an information processing device PC that is a sending destination of an e-mail, and connected to an USB cable 101.

More specifically, the battery driven multi-functional device MF2 (i.e., image processing apparatus) of example 2 has, as shown in FIG. 11, a configuration that is the same as the battery driven multi-functional device MF of example 1, and further includes a USB port 111, and a USB controller 112 at a control board 31.

The USB port 111 is connected to the USB controller 112 and the above-described information processing device PC with the USB cable 101. The USB port 111 transfers signals and data between the USB controller 112 and the information processing device PC.

More specifically, the USB controller 112 conducts, under control of a first CPU 41, transfer of signals and data between the USB controller 112 and the information processing device PC via the USB port 111. Particularly, the USB controller 112 conducts, under control of the first CPU 41 and with the image control method according to an embodiment of the present invention, notification of transmission of a facsimile data (hereinafter may be referred to as facsimile-received data) to the information processing device PC via e-mail. The notification may be as follows. The USB controller 112 outputs a message that notifies the transmission of the facsimile data via e-mail to the information processing device PC, and the message is displayed on a display of the information processing device PC. The USB controller 112 and the USB port 111, as a whole, functions as a device communication unit to communicate with a device of a mail address via at least one line of wired line and wireless line.

In the image processing system GS2 of example 2, the battery driven multi-functional device MF2 conducts an image control process as shown in FIG. 12 when receiving a facsimile. Regarding the following description of FIG. 12, detailed descriptions of processes that are the same as FIG. 6 are omitted.

As shown in FIG. 12, the battery driven multi-functional device MF2 checks, like the battery driven multi-functional device MF of example 1, whether or not a driving power source detection signal Sd is high when the facsimile data is received. When the driving power source detection signal Sd is low, a printer 13 outputs a print of the facsimile-received data on a sheet (i.e., step S101 to step S109).

When the driving power source detection signal Sd is high in step S107, the battery driven multi-functional device MF2 converts the facsimile data to a file with a file format such as Tiff format, compresses the file, and transmits an e-mail with an attachment of the compressed file to a predetermined mail address (i.e., step S110 to step S113).

When the battery driven multi-functional device MF2 conducts e-mail transmission, the battery driven multi-functional device MF2 causes the USB controller 112 notify the information processing device PC, that is the predetermined mail address, of e-mail transmission from the USB port 111. The notification of e-mail transmission may be a mail transmission notice message pre-stored in a ROM 47 of the first CPU 41 that is read out, converted into textual information that can be displayed at the information processing device PC, and transmitted to the information processing device PC from the USB controller 112 via the USB port 111 and the USB cable 101.

In step S202, when the mail transmission notice message is transmitted via the USB cable 101, the information processing device PC outputs and displays (e.g., pop-up output) the mail transmission notice message at the display of the information processing device PC.

As described above, in the image processing system GS2 of example 2, the battery driven multi-functional device MF2 includes the device communication unit to communicate with the device (i.e., information processing device PC) of the mail address (i.e., the predetermined mail address) via at least one line of wired line and wireless line. The first CPU 41 (i.e., facsimile data output control unit) conducts notification of e-mail transmission of the facsimile data to the information processing device PC via the device communication unit when a facsimile board 52 transmits the facsimile data via e-mail to the mail address.

Thus, a user at the transmission destination of the e-mail with the facsimile data is notified of the transmission of the e-mail with the facsimile data, and may promptly extract the e-mail from a POP server PV serving as a mail server and output a print. As a result, power consumption is effectively reduced when being driven with stored power, and operability is enhanced.

EXAMPLE 3

Figure 13:
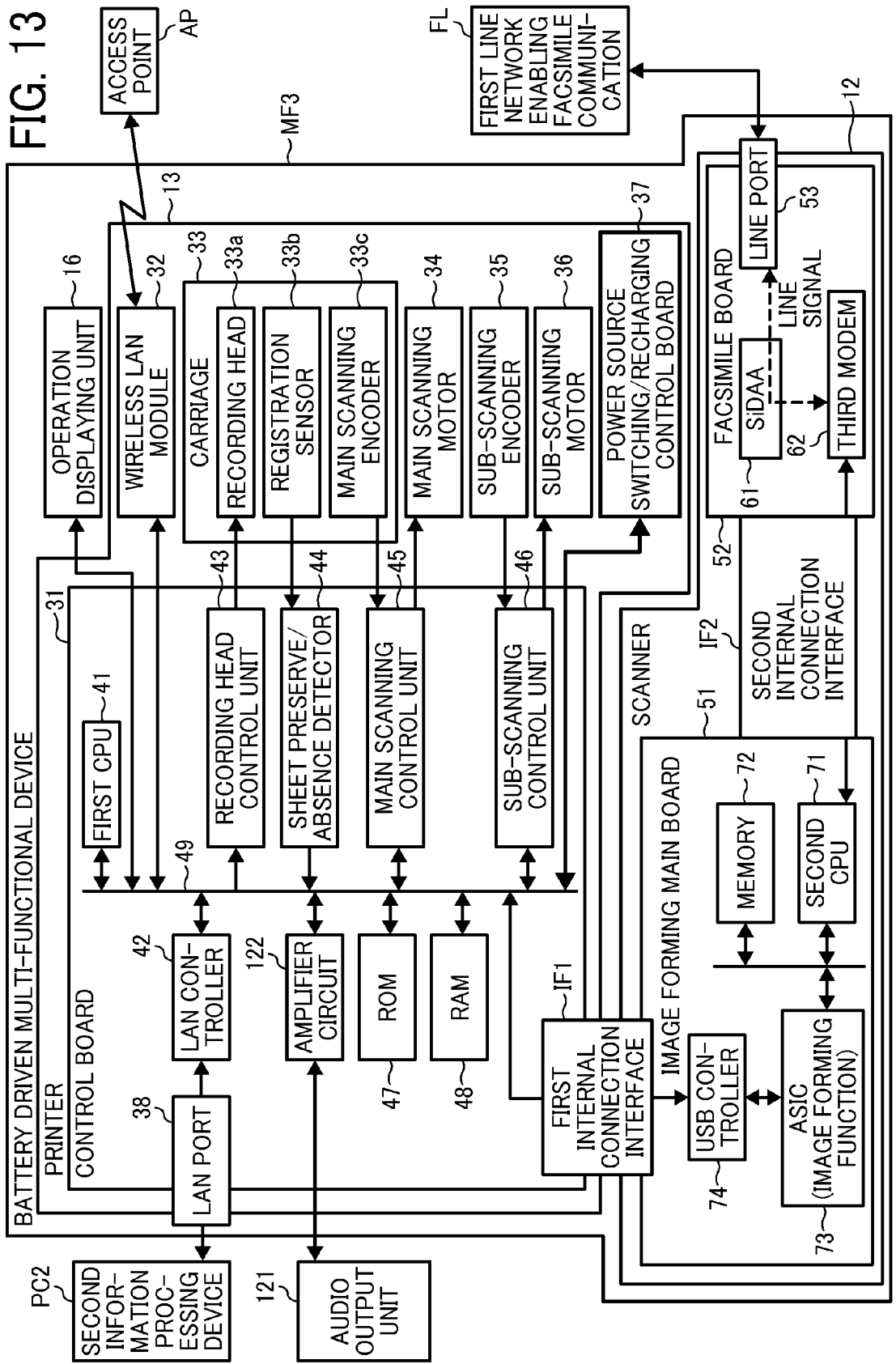
FIG. 13 is a block diagram of a configuration of a battery driven multi-functional device of example 3.
Figure 14:
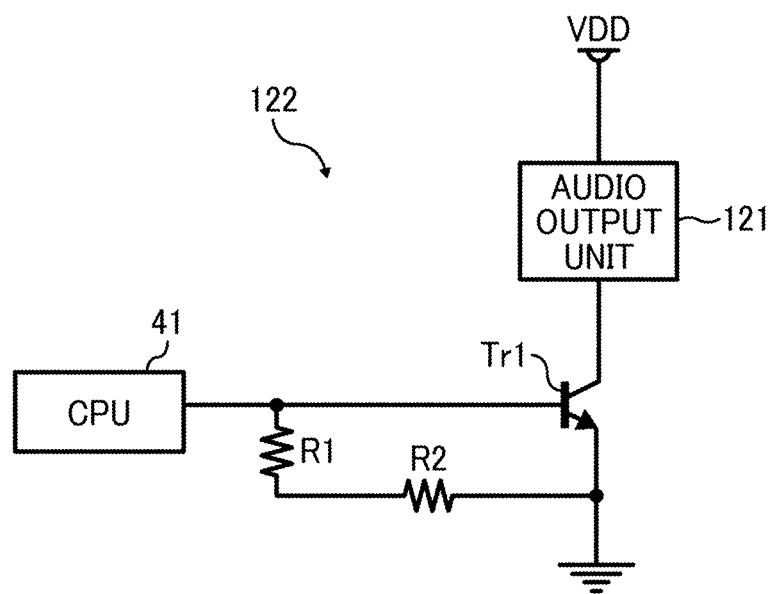
FIG. 14 is an example of a configuration of an amplifier circuit.
Figure 15:
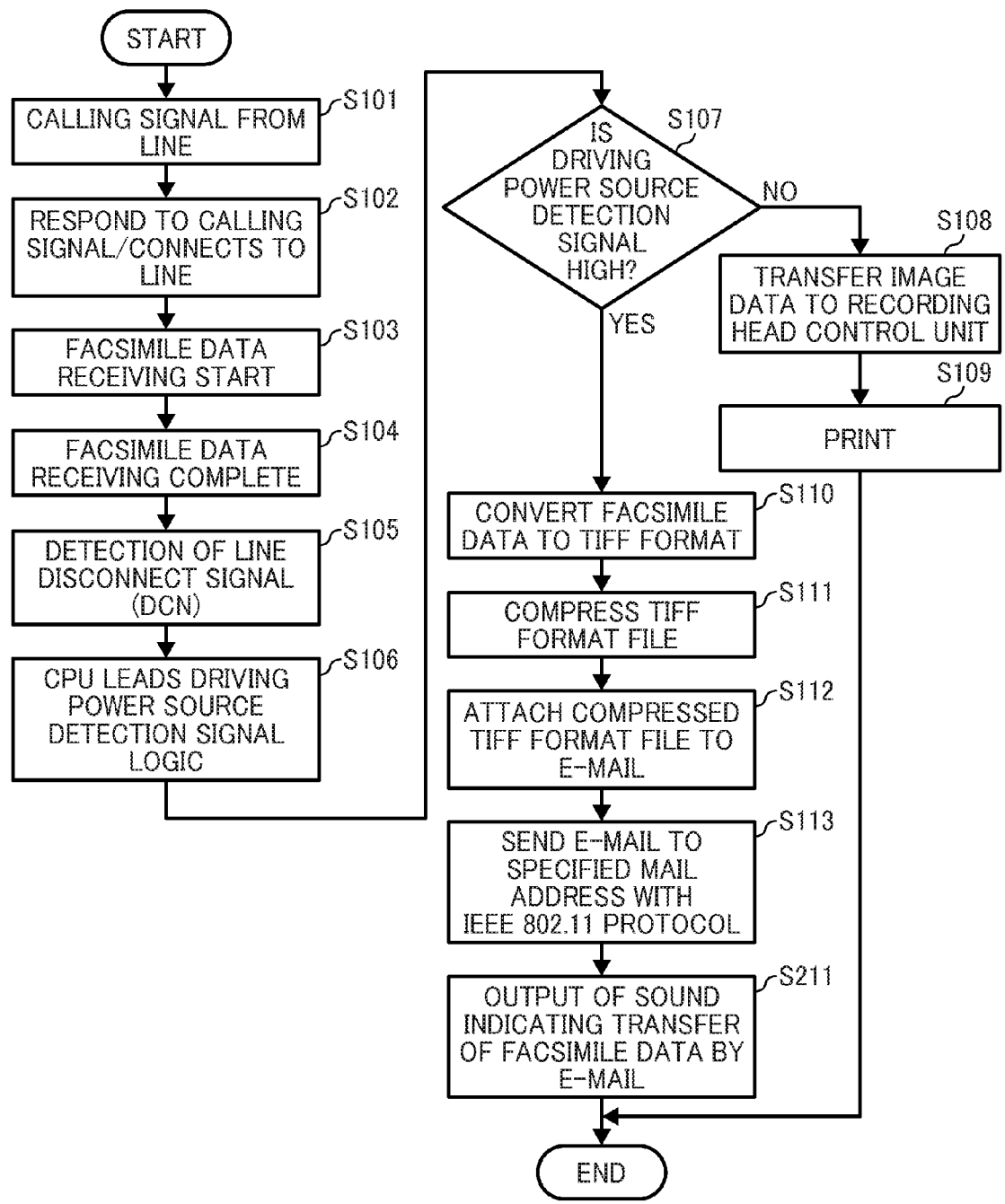
FIG. 15 is a flow chart of an image control process of the battery driven multi-functional device of FIG. 13 when receiving a facsimile.

FIG. 13 to FIG. 15 relate to an image processing apparatus, an image control method, and an image control program according to example 3. FIG. 13 is a block diagram of a configuration of a battery driven multi-functional device MF3 of example 3 employed in an image processing system GS3 of example 3. The following is a description of the image processing apparatus (i.e., battery driven multi-functional device MF3 of example 3), the image control method, and the image control program according to example 3 applied to the image processing system GS3 of example 3.

It is to be noted that the image processing system GS3 of example 3 is the same as the above-described image processing system GS of example 1. More specifically, the battery driven multi-functional device MF3 of example 3 is applied to the image processing system GS of example 1. Further, it is to be noted that in the following description of the image processing system GS3 of example 3, for the sake of simplicity, the same reference numerals will be given to constituent elements such as parts and elements having the same functions as the image processing system GS of example 1, and redundant descriptions thereof omitted.

In the image processing system GS3 of example 3 that is the same as the above-described image processing system GS of example 1, the battery driven multi-functional device MF3 of example 3 is provided instead of the battery driven multi-functional device MF of example 1. The battery driven multi-functional device MF3 (i.e., image processing apparatus) of example 3 can communicate with a line network FL enabling facsimile communication (hereinafter may be referred to as first line network FL) and a second line network ML enabling mail communication (hereinafter may be referred to as second line network ML).

More specifically, the battery driven multi-functional device MF3 has, as shown in FIG. 13, a configuration that is the same as the battery driven multi-functional device MF of example 1, and further includes an audio output unit 121, and an amplifier circuit 122 at a control board 31.

The audio output unit 121 may be a speaker or a buzzer. The audio output unit 121 outputs an amplified sound according to an audio signal transmitted from the amplifier circuit 122.

The amplifier unit 122 amplifies, under control of a first CPU 41, the audio signal transmitted from the first CPU 41 and outputs the amplified audio signal to the audio output unit 121.

As shown in FIG. 14, the amplifier unit 122 may be formed of a transistor Tr1, a first resistor R1, and a second resistor R2. The transistor Tr1 is a grounded emitter. The first CPU 41 is connected to a base of the transistor Tr1 and the audio output unit 121 is connected to a collector of the transistor Tr1. A power source VDD is applied to the transistor Tr1 via the audio output unit 121.

Thus, by driving the base of the transistor Tr1 based on the audio signal with the first CPU 41, the amplifier circuit 122 controls electric current to the audio output unit 121 and amplifies the sound. The audio output unit 121 and the amplifier circuit 122, as a whole, functions as a notification unit and a sound output unit.

In the battery driven multi-functional device MF3, sound data of the sound that is outputted from the audio output unit 121 is pre-stored in a ROM 47. In the battery driven multi-functional device MF3, the first CPU 41 reads out the sound data from the ROM 47, the amplifier circuit 122 amplifies the sound, and the amplified sound is outputted from the audio output unit 121.

The sound data may be an audio message such as "facsimile data has been sent to XXX via e-mail" that notifies completion of transmitting the facsimile data (hereinafter may be referred to as facsimile-received data) via e-mail. Alternatively, the sound data may be, simply, some kind of sound such as a buzzer sound of the buzzer that indicates transfer of the facsimile data via e-mail.

In the image processing system GS3 of example 3, the battery driven multi-functional device MF3 conducts an image control process as shown in FIG. 15 when receiving a facsimile. Regarding the following description of FIG. 15, detailed descriptions of processes that are the same as FIG. 6 are abridged.

As shown in FIG. 15, the battery driven multi-functional device MF3 checks, like the battery driven multi-functional device MF of example 1, whether or not a driving power source detection signal Sd is high when the facsimile data is received. When the driving power source detection signal Sd is low, a printer 13 outputs a print of the facsimile data on a sheet (i.e., step S101 to step S109).

When the driving power source detection signal Sd is high in step S107, the battery driven multi-functional device MF3 converts the facsimile data to a file with a file format such as Tiff format, compresses the file, and transmits an e-mail with an attachment of the compressed file to a predetermined mail address (i.e., step S110 to step S113).

In step S211, when the e-mail is transmitted, the first CPU 41 reads out the sound data from the ROM 47, and the sound that indicates transfer of the facsimile data via e-mail is outputted through the amplifier circuit 122 and the audio output unit 121.

As described above, in the image processing system GS3 of example 3, the battery driven multi-functional device MF3 includes the notification unit formed of the audio output unit 121 and the amplifier circuit 122 to output notification information. The first CPU 41 (i.e., facsimile data output control unit) outputs and informs, with the notification unit, of e-mail transmission of the facsimile data when the facsimile data is transmitted by a wireless LAN module 32 to the predetermined mail address.

Thus, a user is informed of e-mail transmission of the facsimile-received data by audio information outputted from the audio output unit 121 of the battery driven multi-functional device MF3, and operability is enhanced. Further, power consumption is reduced when the battery driven multi-functional device MF3 is driven with stored power of a battery power source.

The audio output unit 121 (i.e., sound output unit) that outputs amplified sound functions as the notification unit.

Thus, the user is informed of e-mail transmission of the facsimile-received data by audio information outputted from the audio output unit 121 of the battery driven multi-functional device MF3, and operability is enhanced while reducing power consumption.

EXAMPLE 4

Figure 16:
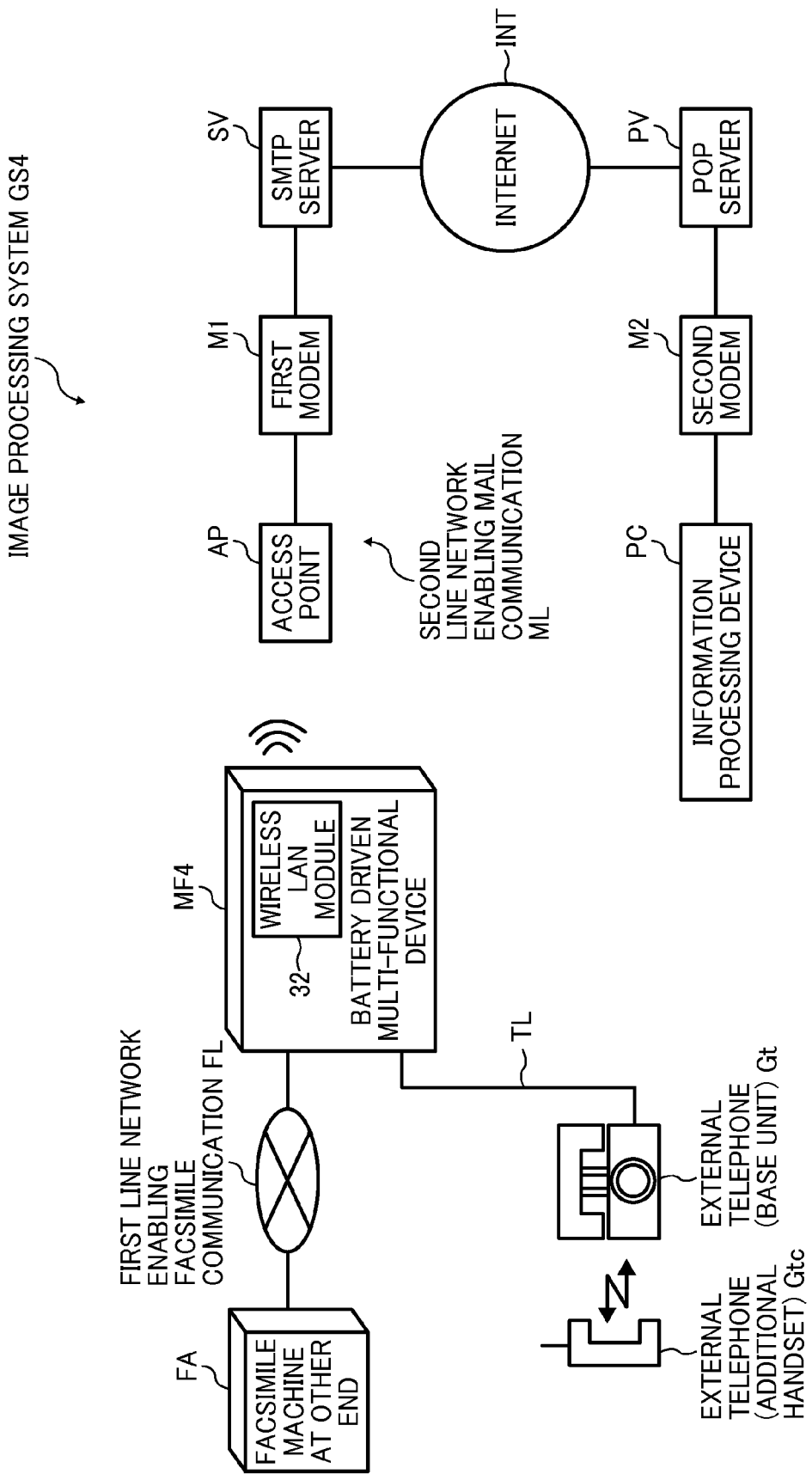
FIG. 16 is a block diagram of a configuration of an image processing system of example 4.
Figure 17:
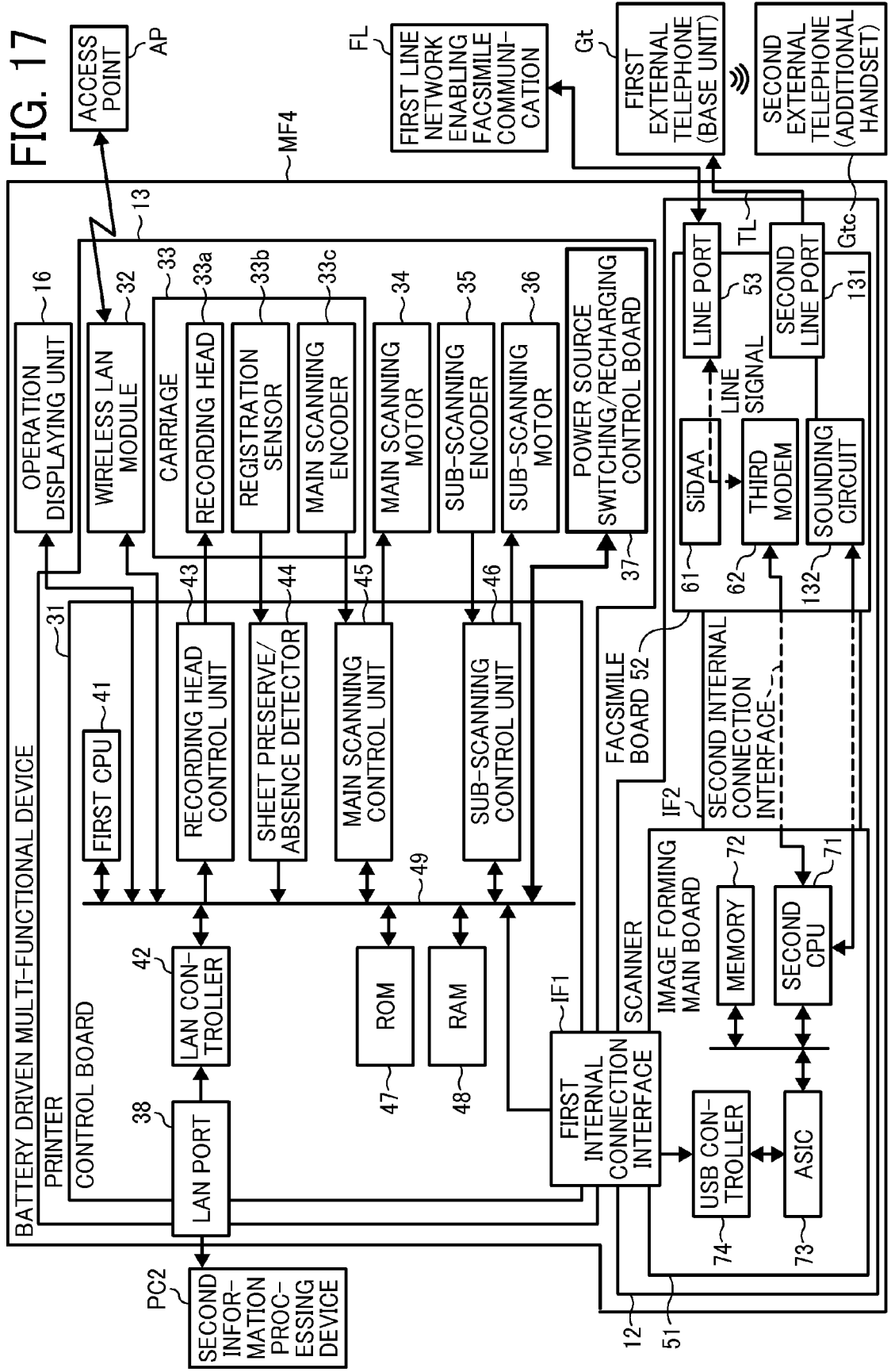
FIG. 17 is a block diagram of a configuration of a battery driven multi-functional device of FIG. 16.
Figure 18:
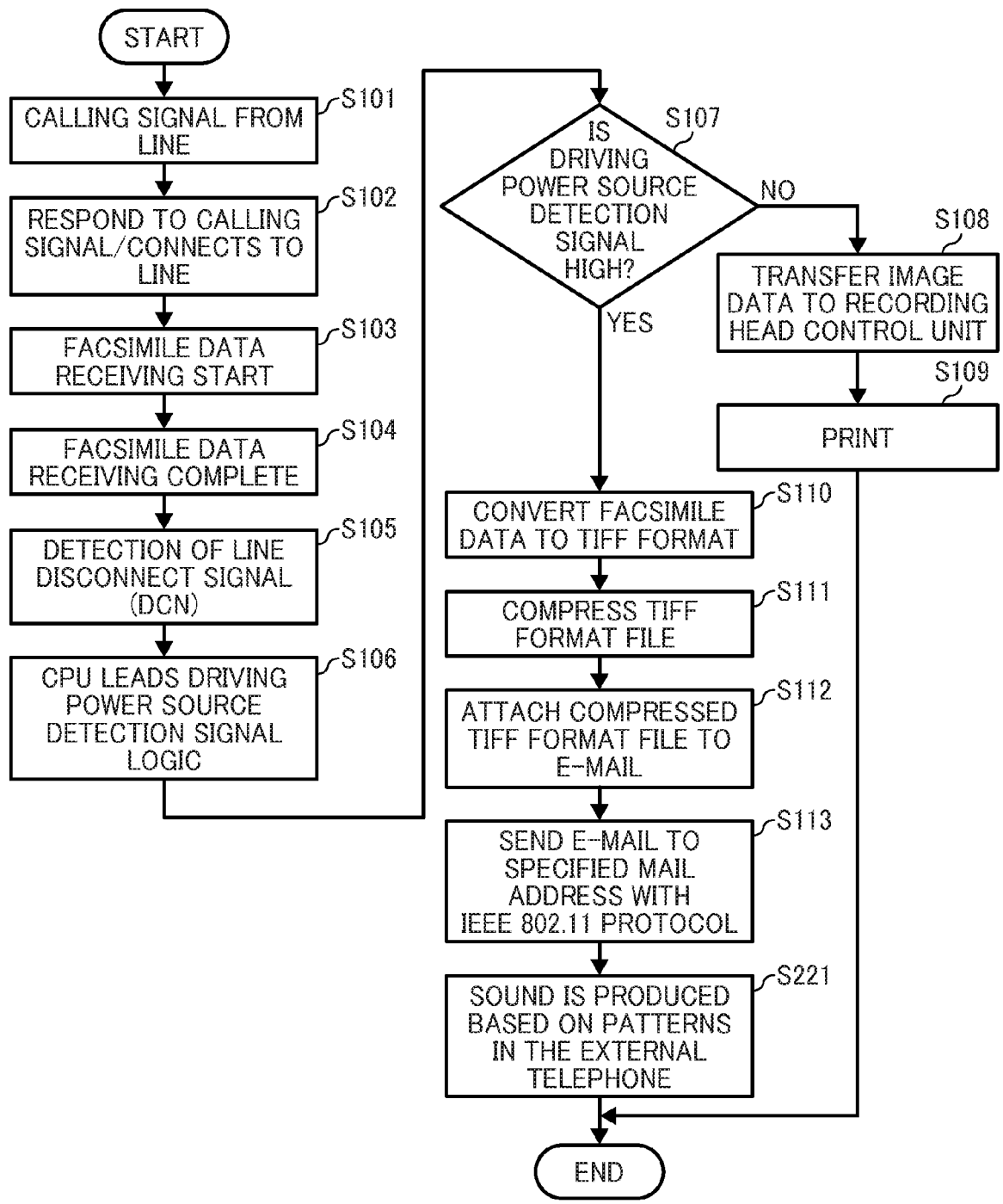
FIG. 18 is a flow chart of an image control process of the battery driven multi-functional device of FIG. 16 when receiving a facsimile.

FIG. 16 to FIG. 18 relate to an image processing apparatus, an image control method, and an image control program according to an embodiment of the present invention of example 4. FIG. 16 is a block diagram of a configuration of an image processing system GS4 in which the image processing apparatus, the image control method, and the image control program according to the embodiment of the present invention of example 4 is applied.

It is to be noted that the image processing system GS4 of example 4 is the same as the above-described image processing system GS of example 1. More specifically, a battery driven multi-functional device MF4 of example 4 is applied to the image processing system GS of example 1. Further, it is to be noted that in the following description of the image processing system GS4 of example 4, for the sake of simplicity, the same reference numerals will be given to constituent elements such as parts and elements having the same functions as the image processing system GS of example 1, and redundant descriptions thereof omitted.

As shown in FIG. 16, in the image processing system GS4 of example 4 that is the same as the image processing system GS of example 1, the battery driven multi-functional device MF4 of example 4 is provided instead of the battery driven multi-functional device MF of example 1. The battery driven multi-functional device MF4 of example 4 can, like the battery driven multi-functional device MF of example 1, communicate with a line network FL enabling facsimile communication (hereinafter may be referred to as first line network FL) and a second line network ML enabling mail communication (hereinafter may be referred to as second line network ML).

With respect to the battery driven multi-functional device MF4 (i.e., image processing apparatus) of example 4, a first external telephone Gt serving as a base unit and a second external telephone Gtc serving as an additional handset are connected, externally. The first external telephone Gt is connected to the battery driven multi-functional device MF4 with a telephone cable TL and the second external telephone Gtc is wirelessly connected to the first external telephone Gt. The first external telephone Gt and the second external telephone Gtc are a typical telephone set in which the first external telephone Gt is the base unit and the second external telephone Gtc is the additional handset.

The battery driven multi-functional device MF4 has, as shown in FIG. 17, a configuration that is the same as the battery driven multi-functional device MF of example 1, and further includes a second line port 131 (i.e., telephone connection unit), and a sounding circuit 132 provided at a facsimile board 52.

The sounding circuit 132 (i.e., sounding unit) is connected to the second line port 131, and the second line port 131 is connected to the first external telephone Gt with the above-described telephone cable TL.

The sounding circuit 132 includes a boosting circuit that generates, for example, a square wave of 100 Vp-p or more. The sounding circuit 132 boosts, with the boosting circuit, a sounding signal from a second CPU 71 of an image forming main board 51 to a square wave sounding signal of 100 Vp-p or more, and sounds the first external telephone Gt.

In the battery driven multi-functional device MF4, a specific sounding signal to notify transmission of a facsimile data (hereinafter may be referred to as facsimile-received data) via e-mail is pre-stored in a ROM 47 A first CPU 41 reads out the specific sounding signal from the ROM 47, amplifies the specific sounding signal with the sounding circuit 132, outputs the specific sounding signal to the first external telephone Gt, and sounds the first external telephone Gt with a specific sound corresponding to the specific sounding signal.

In the image processing system GS4 of example 4, the battery driven multi-functional device MF4 conducts an image control process as shown in FIG. 18 when receiving a facsimile. Regarding the following description of FIG. 18, detailed descriptions of step processes that are the same as FIG. 6 are abridged.

As shown in FIG. 18, the battery driven multi-functional device MF4 checks, like the battery driven multi-functional device MF of example 1, whether or not a driving power source detection signal Sd is high when the facsimile data is received. When the driving power source detection signal Sd is low, a printer 13 outputs a print of the facsimile data on a sheet (i.e., step S101 to step S109).

When the driving power source detection signal Sd is high in step S107, the battery driven multi-functional device MF4 converts the facsimile data to a file with a file format such as Tiff format, compresses the file, and transmits an e-mail with an attachment of the compressed file to a predetermined mail address (i.e., step S110 to step S113).

In step S221, when transmission of the e-mail is conducted, the first CPU 41 reads out the specific sounding signal from the ROM 47, amplifies the specific sounding signal with the sounding circuit 132, outputs the specific sounding signal to the first external telephone Gt, and sounds the first external telephone Gt with the specific sound corresponding to the specific sounding signal. When the first external telephone Gt sounds, the second external telephone Gtc serving as the additional handset also sounds with the same specific sound as the first external telephone Gt.

As described above, in the image processing system GS4 of example 4, the battery driven multi-functional device MF4 includes the second line port 131 (i.e., telephone connection unit); and the sounding circuit 132 (i.e., sounding unit) that sounds the first external telephone Gt, as well as the second external telephone Gtc, connected to the second line port 131. The first CPU 41 (i.e., facsimile data output control unit) causes the sounding circuit 132 to sound the first external telephone Gt and the second external telephone Gtc to notify e-mail transmission of the facsimile data via e-mail when the facsimile data is transmitted by a wireless LAN module 32 to the predetermined mail address.

Thus, a user of the battery driven multi-functional device MF4 is informed of e-mail transmission of the facsimile-received data by sounding of the first external telephone Gt and the second external telephone Gtc. As a result, power consumption is reduced when being driven with stored power of a battery power source, and operability is enhanced.

By making the first external telephone Gt and the second external telephone Gtc sound the specific sound, notification of transmission of the facsimile data via e-mail is possible, and operability is enhanced.

It is to be noted that methods to notify transmission of the facsimile data via e-mail is not limited to employing the first external telephone Gt, the second external telephone Gtc, and generating the above-described specific sound.

Figure 19:
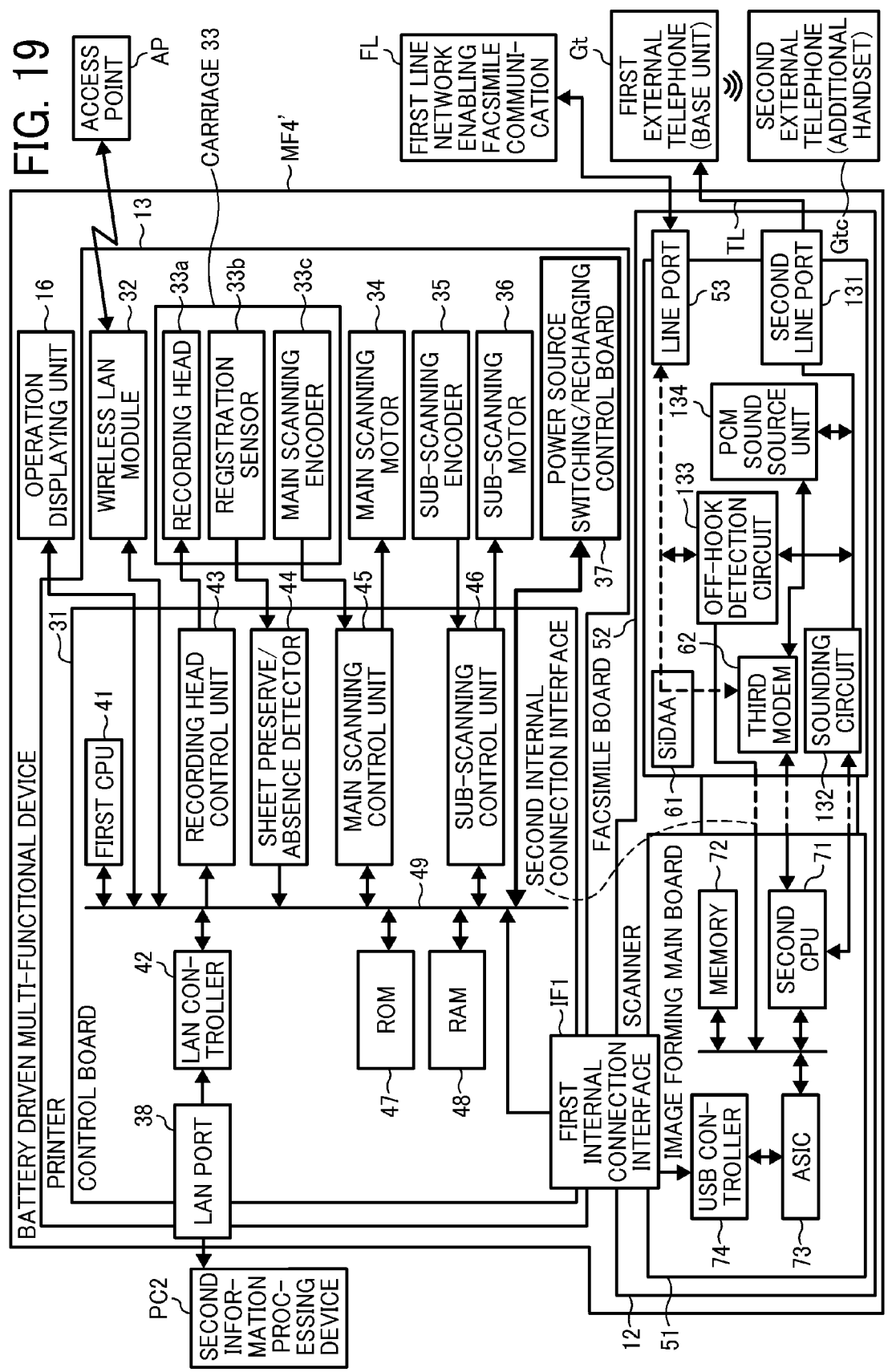
FIG. 19 is a block diagram of another configuration of the battery driven multi-functional device of example 4.

For example, a case as follows is possible. For example, FIG. 19 is a block diagram of a battery driven multi-functional device MF4' that is another configuration of the battery driven multi-functional device MF4 of example 4. As shown in FIG. 19, a facsimile board 52 of the battery driven multi-functional device MF4' includes an off-hook detection circuit 133 and a pulse code modulation (hereinafter referred to as PCM) sound source unit 134, and notification of transmission of a facsimile data (hereinafter may be referred to as facsimile-received data) via e-mail may be conducted by an audio message.

In the PCM sound source unit 134 (i.e., voice data storing unit, voice data sending unit), voice data (i.e., audio message) that notifies e-mail transmission of the facsimile data via e-mail to a predetermined mail address is stored as a PCM sound source.

Figure 20:
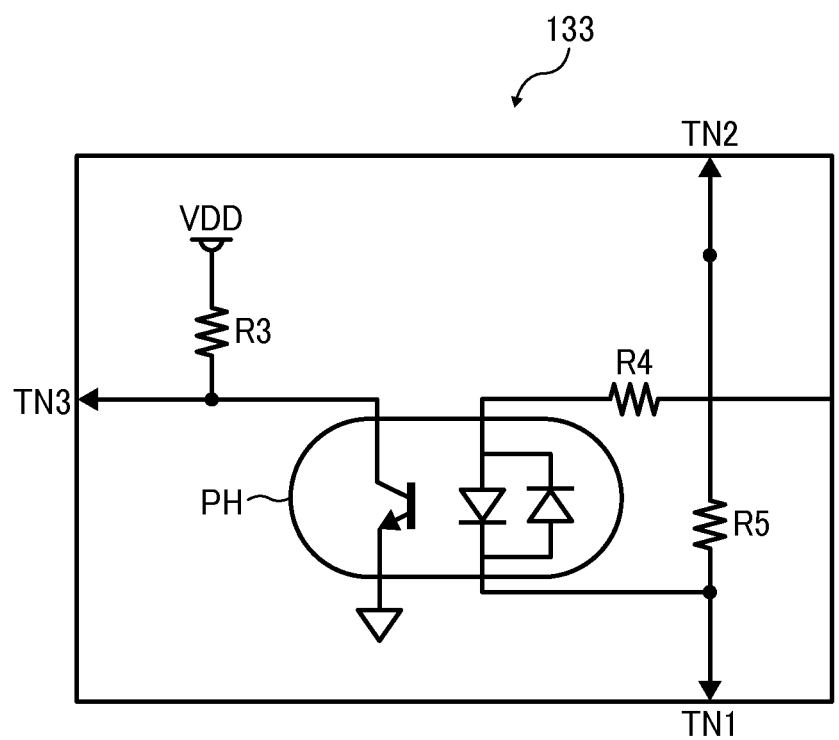
FIG. 20 is an example of a configuration of an off-hook detection circuit.

The off-hook detection circuit 133 (i.e., off-hook detection unit) may have a circuit configuration as shown in FIG. 20. The off-hook detection circuit 133 includes a bidirectional photocoupler PH, a third resistor R3, a fourth resistor R4, a fifth resistor R5, an output terminal TN1 to a second line port 131 that is connected to a first external telephone Gt, an input terminal TN2 from a line port 53 that is connected to a line network FL enabling facsimile communication (hereinafter may be referred to as first line network FL), and an output terminal TN3 to a second CPU 71. In the off-hook detection circuit 133, when the first external telephone Gt is on-hook, the photocoupler PH is off. Accordingly, a voltage of the output terminal TN3 becomes high due to a power source voltage VDD via the resistor R3. When the first external telephone Gt is off-hook, the photocoupler PH is on. Accordingly, a voltage of the output terminal TN3 to the second CPU 71 switches from high to low.

The second CPU 71 determines off-hook based on the voltage from the output terminal TN3 of the off-hook detection circuit 133, and drives the PCM sound source unit 134 via a third modem 62.

When a drive signal is inputted to the PCM sound source unit 134, the PCM sound source unit 134 sends to the first external telephone Gt, via the second line port 131, the audio message that notifies e-mail transmission of the pre-stored facsimile data via e-mail to the predetermined mail address. More specifically, the sent audio message, which is amplified, is outputted from a handset of the first external telephone Gt or a second external telephone Gtc that is off-hook.

Figure 21:
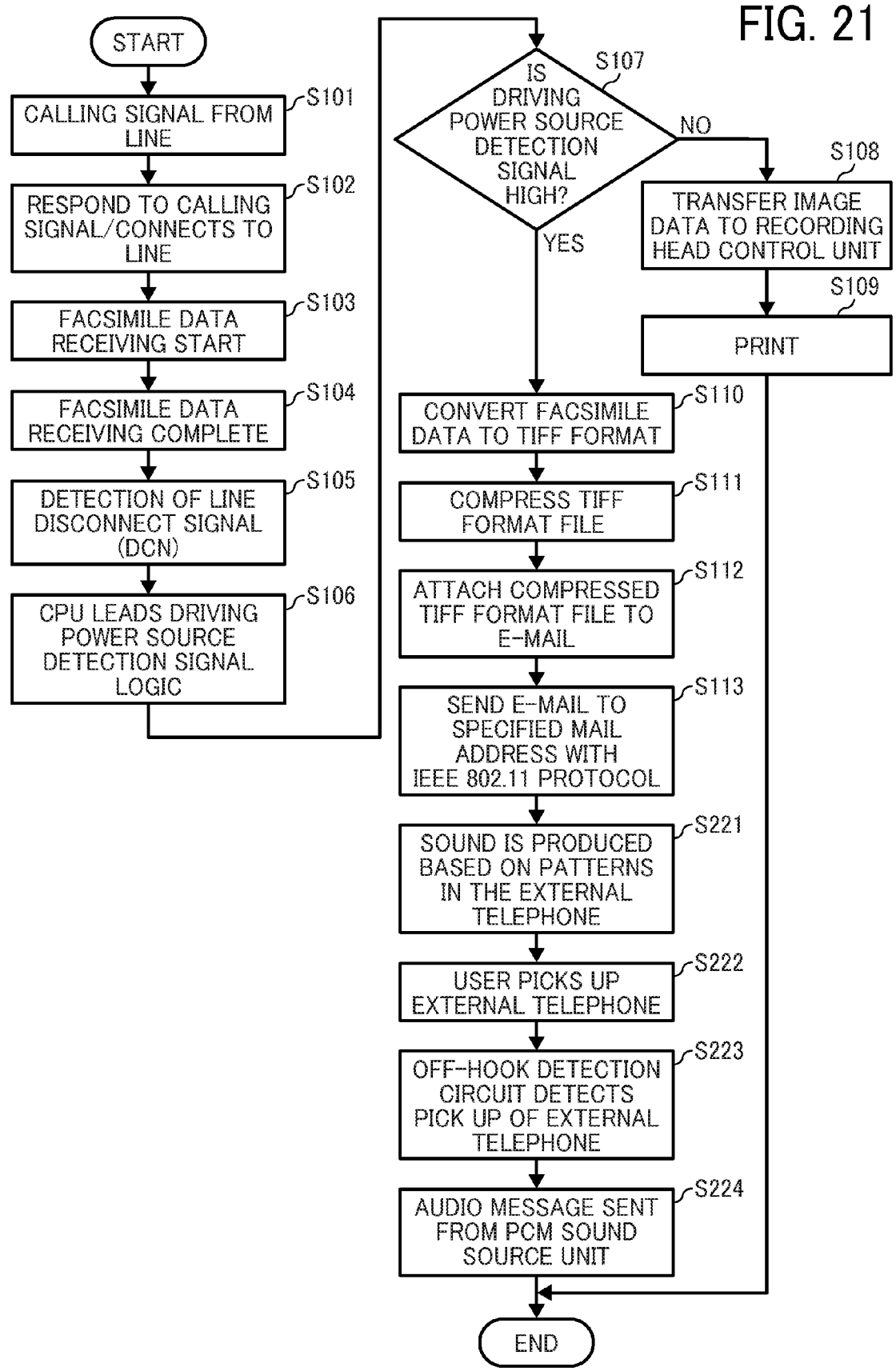
FIG. 21 is a flow chart of an image control process of the battery driven multi-functional device of FIG. 19 when receiving a facsimile.

In an image processing system GS4' of an example 4' that is the image processing system GS4 of example 4 that employs the battery driven multi-functional device MF4' instead of the the battery driven multi-functional device MF4, the battery driven multi-functional device MF4' conducts an image control process as shown in FIG. 21 when receiving a facsimile. Regarding the following description of FIG. 21, detailed descriptions of step processes that are the same as FIG. 6 and FIG. 18 are abridged.

As shown in FIG. 21, the battery driven multi-functional device MF4' checks, like the battery driven multi-functional device MF of example 1, whether or not a driving power source detection signal Sd is high when the facsimile data is received. When the driving power source detection signal Sd is low, a printer 13 outputs a print of the facsimile-received data on a sheet (i.e., step S101 to step S109).

When the driving power source detection signal Sd is high in step S107, the battery driven multi-functional device MF4' converts the facsimile data to a file with a file format such as Tiff format, compresses the file, and transmits an e-mail with an attachment of the compressed file to a predetermined mail address (i.e., step S110 to step S113).

In step S221, when transmission of the e-mail is conducted, a first CPU 41 reads out a specific sounding signal from a ROM 47, amplifies the specific sounding signal with a sounding circuit 132, outputs the specific sounding signal to the first external telephone Gt, and sounds the first external telephone Gt with a specific sound corresponding to the specific sounding signal. When the first external telephone Gt sounds, the second external telephone Gtc serving as an additional handset also sounds with the same specific sound as the first external telephone Gt.

When a user picks up one of the first external telephone Gt and the second external telephone Gtc that corresponds to step S222, the off-hook detection circuit 133 detects off-hook (i.e., picking up of one of the first external telephone Gt and the second external telephone Gtc) that corresponds to step S223.

When off-hook is detected, the second CPU 71 drives the PCM sound source unit 134 and sends the audio message that notifies e-mail transmission of the facsimile data via e-mail to the predetermined mail address that corresponds to step S224, and the image control process is ended.

As described above, in the image processing system GS4' of example 4', the battery driven multi-functional device MF4' includes the PCM sound source unit 134 (i.e., voice data storing unit, voice data sending unit) to store the voice data (i.e., audio message) that notifies e-mail transmission of the facsimile data via e-mail, and to send the audio message to the first external telephone Gt and the second external telephone Gtc via the second line port 131 (i.e., telephone connection unit); and the off-hook detection circuit 133 (i.e., off-hook detection unit) to detect off-hook of one of the first external telephone Gt and the second external telephone Gtc. The first CPU 41 (i.e., facsimile data output control unit) causes, via the second CPU 71, the sounding circuit 132 to sound the first external telephone Gt and the second external telephone Gtc to notify e-mail transmission of the facsimile data via e-mail when the facsimile data is transmitted by a wireless LAN module 32 to the predetermined mail address, and causes the PCM sound source unit 134 to send the audio message when the off-hook detection circuit 133 detects off-hook of one of the first external telephone Gt and the second external telephone Gtc.

Thus, the battery driven multi-functional device MF4' reliably informs of e-mail transmission of the facsimile-received data with respect to the user of the first external telephone Gt and the second external telephone Gtc by the audio message. As a result, power consumption is reduced when being driven with stored power of a battery power source, and operability is further enhanced.

EXAMPLE 5

Figure 22:
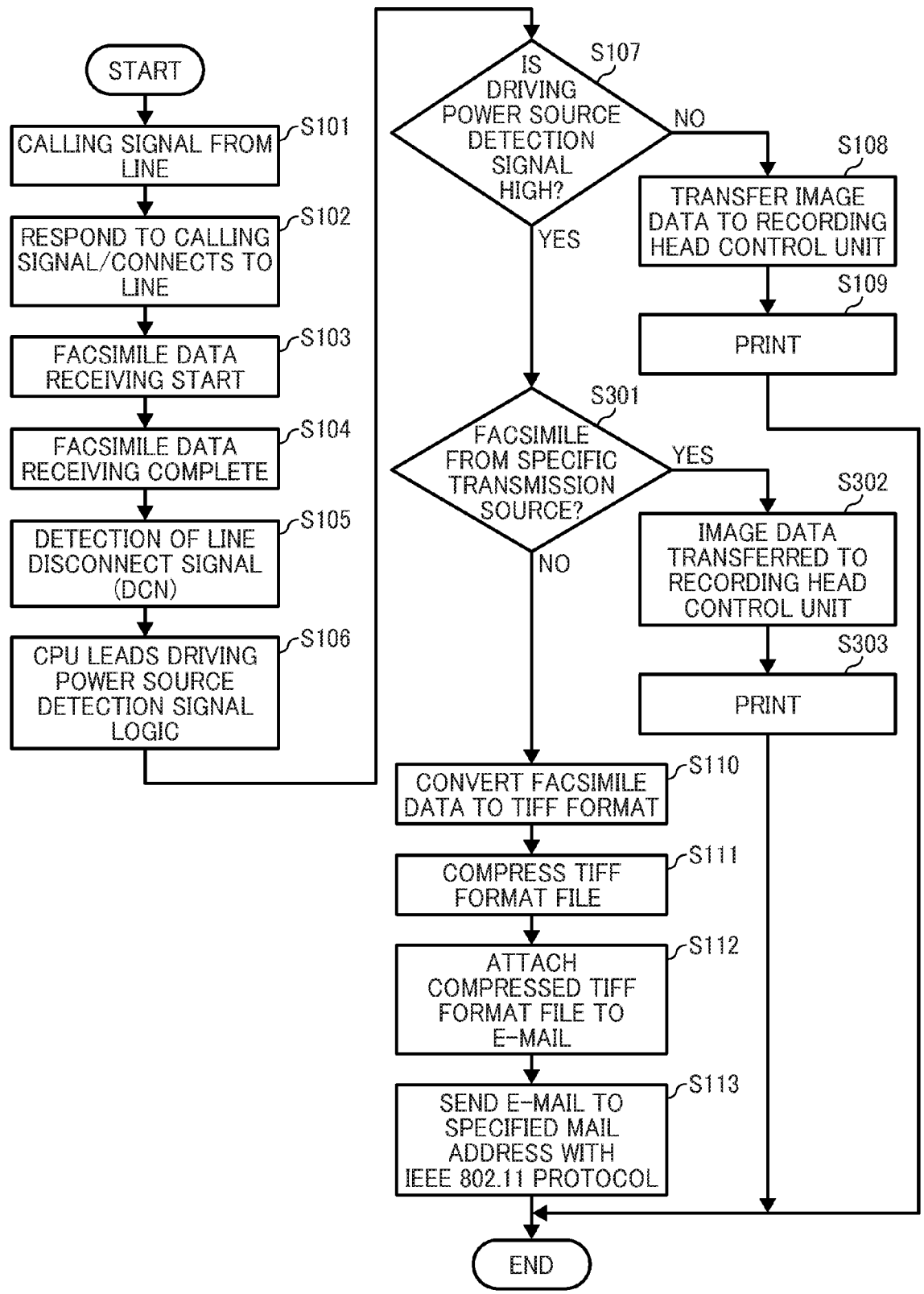
FIG. 22 is a flow chart of an image control process of a battery driven multi-functional device of example 5 when receiving a facsimile.

FIG. 22 relate to an image processing apparatus, an image control method, and an image control program according to an embodiment of the present invention of example 5.

FIG. 22 is a flow chart of an image control process, when receiving a facsimile, of an image processing system GS5 in which the image processing apparatus, the image control method, and the image control program according to the embodiment of the present invention of example 5 is applied.

It is to be noted that the image processing system GS5 of example 5 is the same as the above-described image processing system GS of example 1. More specifically, a battery driven multi-functional device MF5 of example 5 is applied to the image processing system GS of example 1. Further, it is to be noted that in the following description of the image processing system GS5 of example 5 and the battery driven multi-functional device MF5, for the sake of simplicity, the same reference numerals will be given to constituent elements such as parts and elements having the same functions as the image processing system GS of example 1, and redundant descriptions thereof omitted or abridged.

In the image processing system GS5 of example 5, the battery driven multi-functional device MF5 includes a facsimile board 52 having a number display function. The number display function (i.e., number acquisition unit) acquires a telephone number of a transmitting source of a facsimile data (hereinafter may be referred to as facsimile-received data) when conducting receival of the facsimile data.

Further, in the battery driven multi-functional device MF5, a telephone number of a transmitting source that is pre-registered in a ROM 47 is designated as a specific transmission source. The specific transmission source is a designation in which there is a need to promptly output a print of the facsimile-received data onto a sheet at a printer 13 without transmitting an e-mail with the facsimile-received data even when the battery driven multi-functional device MF5 is driven with stored power of a battery power source. The specific transmission source is registered in the ROM 47 by a first CPU 41 when an input operation of the telephone number of the specific transmission source is conducted with an operation display panel 16 of the battery driven multi-functional device MF5 in a specific transmission source registration mode.

The battery driven multi-functional device MF5 conducts, with the telephone number of the above-described specific transmission source pre-registered in the ROM 47, the image control process shown in FIG. 22 when receiving the facsimile data. Regarding the following description of FIG. 22, detailed descriptions of step processes that are the same as FIG. 6 are omitted or abridged.

As shown in FIG. 22, the battery driven multi-functional device MF5 checks, like the battery driven multi-functional device MF of example 1, whether or not a driving power source detection signal Sd is high when the facsimile data is received. When the driving power source detection signal Sd is low, the printer 13 outputs the print of the facsimile-received data on a sheet (i.e., step S101 to step S109).

When the driving power source detection signal Sd is high in step S107, the first CPU 41 acquires the telephone number of the transmitting source with the number display function and checks whether or not the facsimile is from the specific transmission source in step S301.

In step S301, when the facsimile is from the specific transmission source (i.e., corresponding to YES in step S301), the first CPU 41 converts, employing a RAM 48, the facsimile-received data to an image data that is appropriate for output with the printer 13 and, in step S302, transfers the image data to a recording head control unit 43. In step S303, the first CPU 41 conducts printing of an image onto the sheet by controlling drive of a recording head 33a of a carriage 33 with the recording head control unit 43 and controlling drive of a main scanning motor 34 and a sub-scanning motor 36, and ends the image control process.

In step S301, when the facsimile is from a transmitting source other than the specific transmission source (i.e., corresponding to NO in step S301), the first CPU 41 converts the facsimile data to a file with a file format such as Tiff format, compresses the file, and transmits an e-mail with an attachment of the compressed file to a predetermined mail address (i.e., step S110 to step S113).

As described above, in the image processing system GS5 of example 5, the battery driven multi-functional device MF5 includes the facsimile board 52 (i.e., facsimile communication unit) having the number display function that acquires the telephone number of the transmitting source of the facsimile data. The first CPU 41 serving as a facsimile data output control unit outputs a record of the facsimile data with the printer 13 (i.e., outputting unit) when the telephone number of the transmitting source of the facsimile data is pre-registered.

Thus, prompt learning of content of the facsimile of pre-registered senders, desired to be known by the user, can be outputted with the printer 13 without transmitting the e-mail with the facsimile data. Thus, operability is enhanced while reducing power consumption.

EXAMPLE 6

Figure 23:
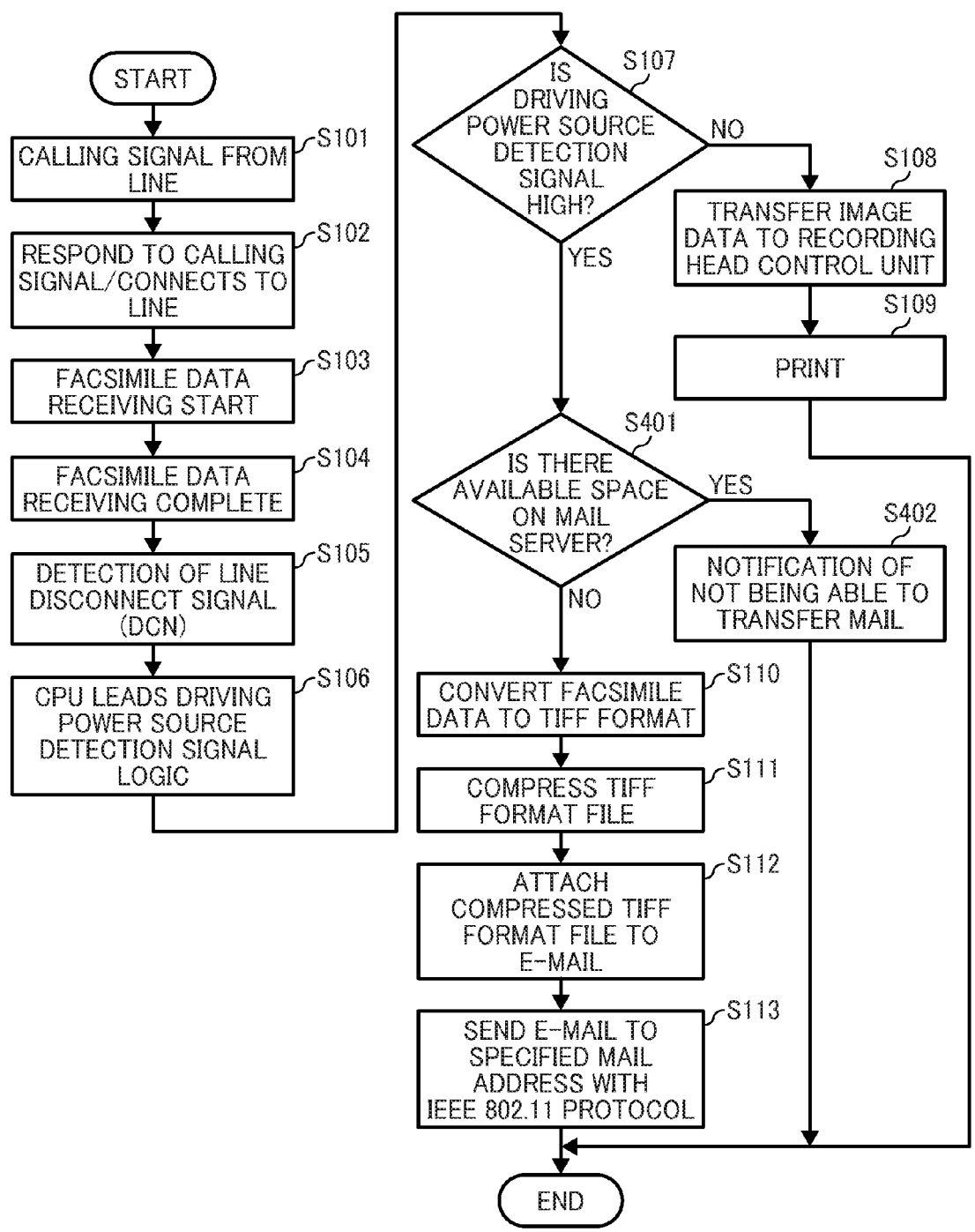
FIG. 23 is a flow chart of an image control process of a battery driven multi-functional device of example 6 when receiving a facsimile.
Figure 24:
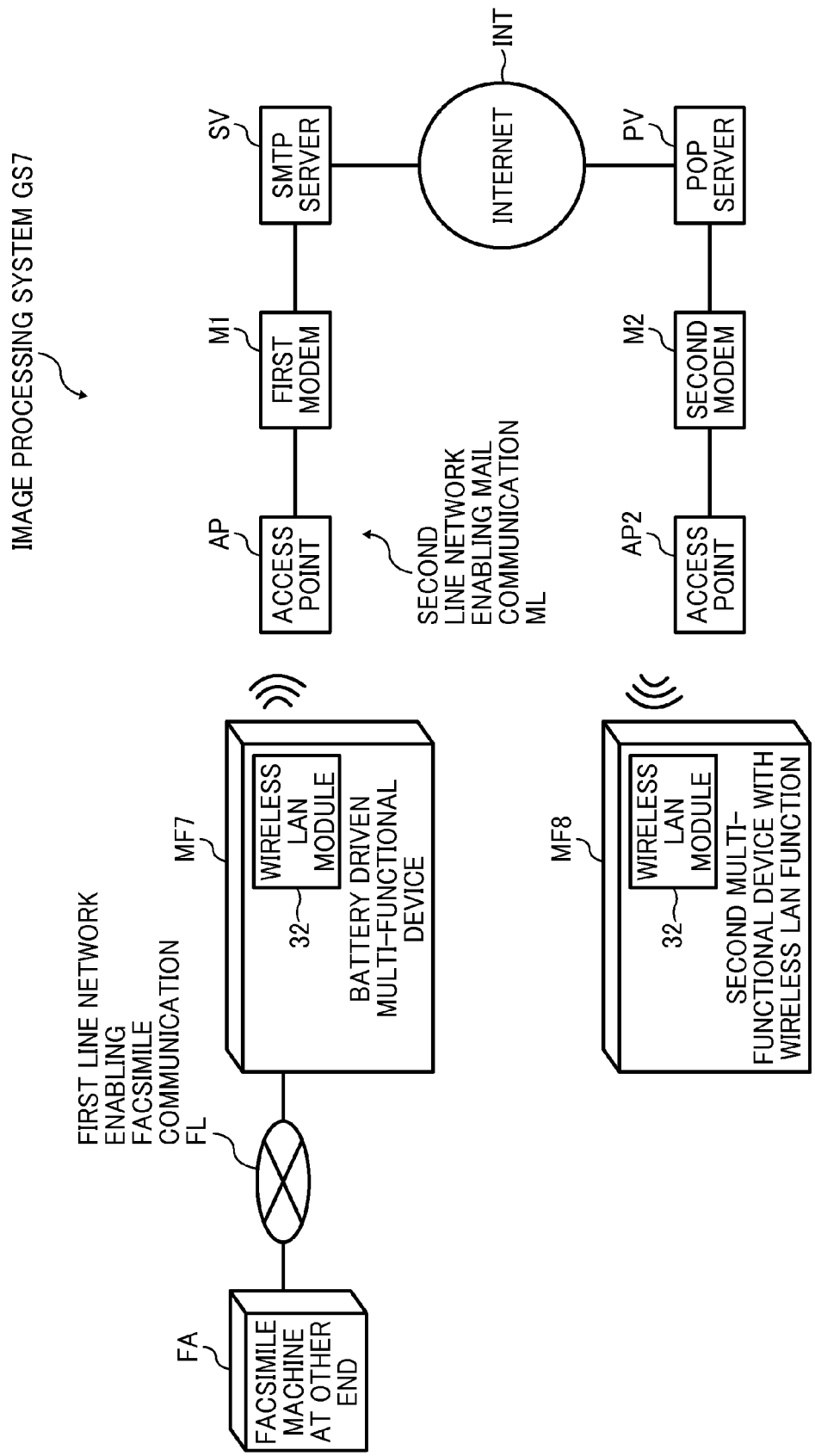
FIG. 24 is a block diagram of a configuration of an image processing system according to an embodiment of the present invention enabling ad-hoc communication.
Figure 25:
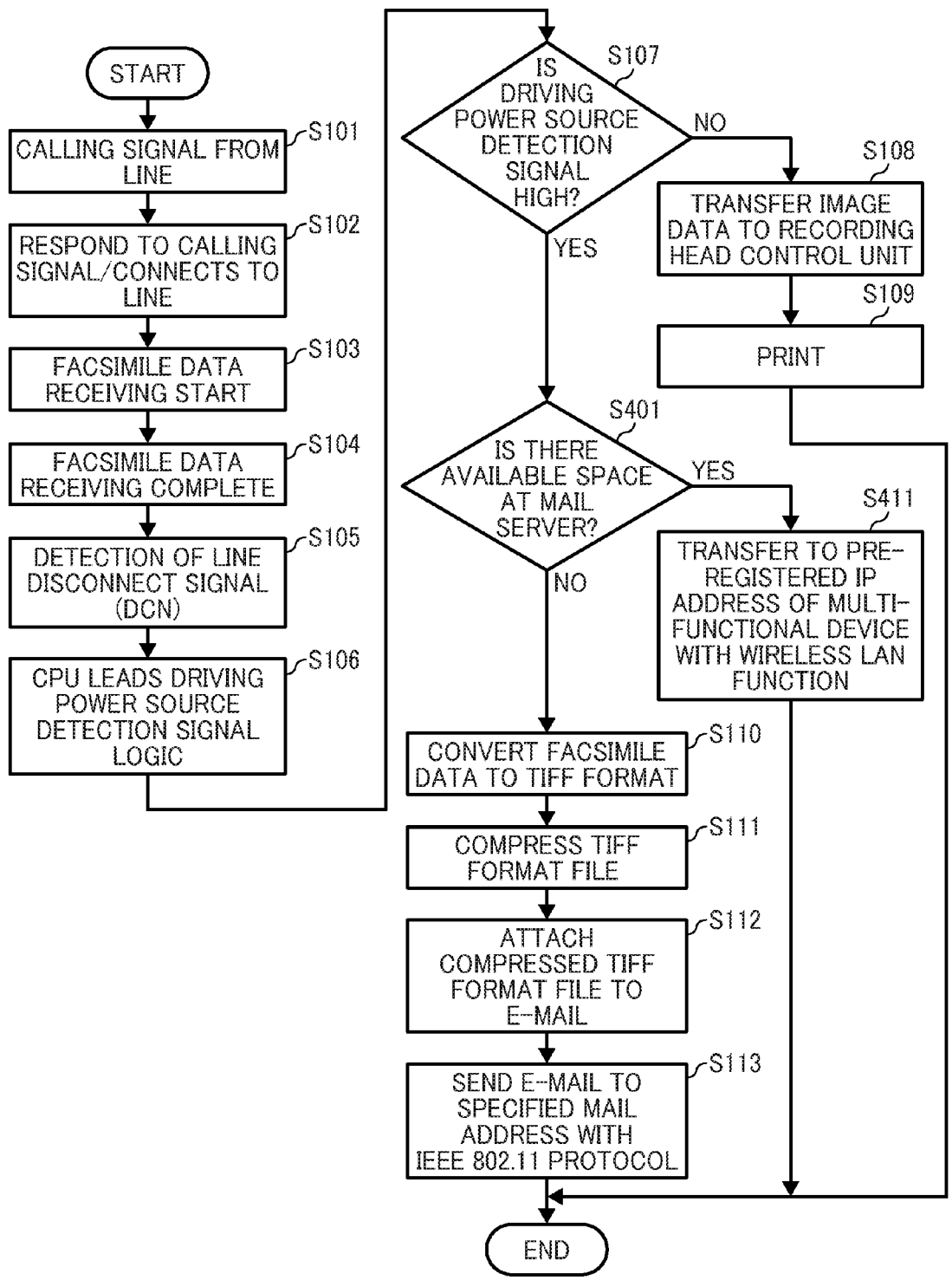
FIG. 25 is a flow chart of an image control process of a battery driven multi-functional device of FIG. 24 employing ad-hoc communication when receiving a facsimile.

FIG. 23 to FIG. 25 relate to an image processing apparatus, an image control method, and an image control program according to an embodiment of the present invention of example 6. FIG. 23 is a flow chart of an image control process, when receiving a facsimile, of an image processing system GS6 in which the image processing apparatus, the image control method, and the image control program according to the embodiment of the present invention of example 6 is applied.

It is to be noted that the image processing system GS6 of example 6 is the same as the above-described image processing system GS of example 1. More specifically, a battery driven multi-functional device MF6 of example 6 is applied to the image processing system GS of example 1. Further, it is to be noted that in the following description of the image processing system GS6 of example 6 and the battery driven multi-functional device MF6, for the sake of simplicity, the same reference numerals will be given to constituent elements such as parts and elements having the same functions as the image processing system GS of example 1, and redundant descriptions thereof omitted or abridged.

In the image processing system GS6 of example 6, the battery driven multi-functional device MF6 includes a function to acquire available space on a mail server that is a POP server PV. The function to acquire available space on the POP server PV (hereinafter may be referred to as available space acquiring function) may employ a method that uses an available space information sent from a mail server available space monitoring service that is normally provided by the POP server PV.

The battery driven multi-functional device MF6, including the above-described function to acquire available space on the POP server PV, conducts the image control process shown in FIG. 23 when receiving a facsimile data (hereinafter may be referred to as facsimile-received data). Regarding the following description of FIG. 23, for the sake of simplicity, the same reference numerals will be given to step processes that are the same as FIG. 6, and redundant descriptions thereof omitted or abridged.

As shown in FIG. 23, the battery driven multi-functional device MF6 checks, like the battery driven multi-functional device MF of example 1, whether or not a driving power source detection signal Sd is high when the facsimile data is received. When the driving power source detection signal Sd is low, a printer 13 outputs a print of the facsimile-received data on a sheet (i.e., step S101 to step S109).

When the driving power source detection signal Sd is high in step S107, a first CPU 41 checks whether or not there is sufficient available space on the POP server PV in step S401.

In step S401, when available space is insufficient (i.e., corresponding to NO in step S401), the first CPU 41 notifies that transfer of the facsimile data via e-mail to an information processing device PC is not possible in step S402, and ends the image control process. The notification of not being able to transfer the facsimile data via e-mail may be conducted by displaying a notification on a display 17 of an operation display panel 16. If the battery driven multi-functional device MF6 includes, like in the battery driven multi-functional device MF3 of example 3, an audio output unit 121 and an amplifier circuit 122, the first CPU 41 outputs an audio message that informs of not being able to transfer the facsimile data via e-mail to the information processing device PC due to insufficient space on the POP server PV, or outputs a buzzer sound that informs of not being able to transfer the facsimile data via e-mail to the information processing device PC due to insufficient space on the POP server PV. If the battery driven multi-functional device MF6 includes, like in the battery driven multi-functional device MF4' of example 4', a sounding circuit 132, an off-hook detection circuit 133, and a PCM sound source unit 134, notification of not being able to transfer the facsimile data via e-mail to the information processing device PC due to insufficient space on the POP server PV may be conducted by sounding one of a first external telephone Gt and a second external telephone Gtc and outputting an audio message.

When transmission of the facsimile data via e-mail is not possible due to insufficient space on the POP server PV, the first CPU 41 stores the facsimile data in a RAM 48. Regarding the facsimile data stored in the RAM 48, the first CPU 41 conducts, for example, outputting of the print of the facsimile data when generation of internal power switches from stored power to external power, and transmitting of the facsimile data via e-mail to a predetermined mail address when sufficient space on the POP server PV becomes available. In step S401, when there is sufficient space (i.e., corresponding to YES in step S401), the first CPU 41 converts the facsimile data to a file with a file format such as Tiff format, compresses the file, and transmits an e-mail with an attachment of the compressed file to the predetermined mail address (i.e., step S110 to step S113).

As described above, in the image processing system GS6 of example 6, the battery driven multi-functional device MF6 includes the first CPU 41 (i.e, available space confirming unit) having the function to confirm available space on the mail server that is the POP server PV that stores mail to the predetermined mail address, the display 17 of the operation display panel 16 to output notification information, a notification unit such as the audio output unit 121 and the amplifier circuit 122. The first CPU 41 (i.e., facsimile data output control unit) conducts, with respect to e-mail transmission to the predetermined mail address, notification of information, with the notification unit, of not being able to transmit the facsimile data via e-mail to the predetermined mail address due to insufficient space on the mail server.

Thus, notification of not being able to transmit the facsimile data via e-mail when there is insufficient space on the POP server PV may be outputted, power consumption is reduced, and prompts a user to respond. Thus, operability is enhanced.

It is to be noted that processes after the above-described step S401, when available space on the POP server PV is insufficient, is not limited to the above-described storing of the facsimile data and the notification of not being able to transmit the facsimile data via e-mail (hereinafter may be referred to as mail). For example, a process of conducting data transmission with ad-hoc communication to another pre-set destination is also possible. For example, a case as follows is possible. In an image processing system GS7, as shown in FIG. 24, includes an second access point AP2 in a second line network ML enabling mail communication (hereinafter may be referred to as second line network ML). Wireless communication with a second battery driven multi-functional device MF8 including a wireless LAN function is possible. In the image processing system GS7, a battery driven multi-functional device MF7 may transmit a facsimile-received data (i.e., hereinafter may be referred to as facsimile data) to the second battery driven multi-functional device MF8 with ad-hoc communication. The second battery driven multi-functional device MF8 includes a wireless LAN module to wirelessly communicate with the second access point AP2.

When the battery driven multi-functional device MF7 wirelessly transmits the facsimile data with a wireless LAN module 32 (i.e., wireless mail transmitting unit) to an access point AP with ad-hoc communication, the second line network ML directly transmits, wirelessly, the facsimile data to the second battery driven multi-functional device MF8 that is the pre-set destination from the second access point AP2. In the battery driven multi-functional device MF7, an ip address (i.e., wireless mail address) of the pre-set destination is pre-registered in a ROM 47 for transmission of the facsimile data with ad-hoc communication.

More specifically, in the above-described case, when the battery driven multi-functional device MF7 includes the above-described available space acquiring function with respect to a POP server PV and there is receival of the facsimile data, an image control process as shown in FIG. 25 is conducted. Regarding the following description of FIG. 25, for the sake of simplicity, the same reference numerals will be given to step processes that are the same as FIG. 6 and FIG. 23, and redundant descriptions thereof omitted or abridged.

As shown in FIG. 25, the battery driven multi-functional device MF7 checks, like the battery driven multi-functional device MF of example 1, whether or not a driving power source detection signal Sd is high when the facsimile data is received. When the driving power source detection signal Sd is low, a printer 13 outputs a print of the facsimile-received data on a sheet (i.e., step S101 to step S109).

When the driving power source detection signal Sd is high in step S107, a first CPU 41 checks whether or not there is sufficient available space on the POP server PV in step S401.

In step S401, when available space is insufficient (i.e., corresponding to NO in step S401), the first CPU 41 wirelessly transfers the facsimile data to the pre-registered ip address of the second battery driven multi-functional device MF8 with ad-hoc communication in step S411, and ends the image control process.

In step S401, when there is sufficient space (i.e., corresponding to YES in step S401), the first CPU 41 converts the facsimile data to a file with a file format such as Tiff format, compresses the file, and transmits an e-mail with an attachment of the compressed file to a predetermined mail address (i.e., step S110 to step S113).

As described above, in the image processing system GS7, the battery driven multi-functional device MF7 includes the available space confirming unit having the function to confirm available space on a mail server that is the POP server PV that stores mail to the predetermined mail address, and the wireless LAN module 32 (i.e., wireless mail transmitting unit) to directly transmit, wirelessly, the facsimile data via mail to the ip address (i.e., wireless mail address) of the pre-set destination. The first CPU 41 serving as a facsimile data output control unit conducts, with respect to mail transmission to the predetermined mail address, transmission of the facsimile data via mail, employing the wireless LAN module 32, to the ip address when there is insufficient space on the mail server.

Thus, even when available space on the POP server PV is insufficient, the facsimile data can be sent via mail with ad-hoc communication. Accordingly, power consumption is reduced, and operability is enhanced.

Figure 26:
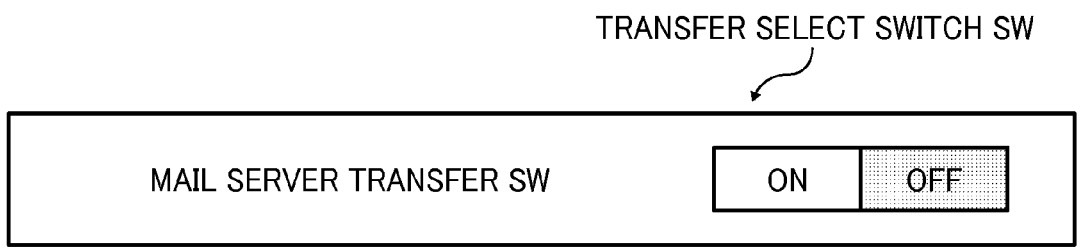
FIG. 26 is an example of a transfer selection switch.

It is to be noted that in each of the above-described examples and cases, whether or not to transfer the facsimile data in each of the image control processes may be made a manual operation of selecting by a user when internal power is supplied by stored power. In a case of manual operation of selecting, the above-described battery driven multi-functional devices MF, MF2, MF3, MF4, MF4', MF5, MF6, and MF7 include, as shown in FIG. 26, a transfer selection switch SW (i.e., selecting unit) that may be a hardware switch, or a function switch on an operation screen of the operation display panel 16. When the transfer selection switch SW is ON, as described above, each of the above-described battery driven multi-functional devices MF, MF2, MF3, MF4, MF4', MF5, MF6, and MF7 conduct each image control processes that transfer the facsimile data according to whether internal power is supplied by stored power or external power. When the transfer selection switch SW is OFF, irrelevent to whether internal power is supplied by stored power or external power, the output of the print of the facsimile-received data is conducted with the printer 13.

Accordingly, even when driven on stored power, prompt output of the print of the facsimile-received data is possible. By appropriately operating the transfer selection switch SW according to a time period, operability of the above-described battery driven multi-functional devices MF, MF2, MF3, MF4, MF4', MF5, MF6, and MF7 are enhanced.

The above-described exemplary embodiments of the present invention are preferable exemplary embodiments. However, the present invention is not limited to the above-described exemplary embodiments, but may be modified and improved within the scope of the present disclosure.

What is claimed is:

1. An image processing apparatus, comprising:
a facsimile communication unit to transmit or receive facsimile data;
a mail communication unit to transmit or receive email data;
an outputting unit to output an image of facsimile data received at the facsimile communication unit;
an external power source processing unit to operate the image processing apparatus using external power supplied from an external power source;
a power-storing source processing unit to operate the image processing apparatus using stored power stored in a power-storing unit;
a power source detection unit to detect whether the apparatus is operated with the external power supplied from the external power source or the stored power supplied from the power-storing unit to output a detection result; and
a facsimile data output control unit that, when the facsimile communication unit completes receipt of all of the facsimile data, converts the facsimile data into a data format corresponding to mail transmission and causes the mail communication unit to transmit the converted data to a destination address via e-mail based on the detection result indicating that the stored power is supplied, and converts the facsimile data into image data corresponding to the image output by the outputting unit and causes the outputting unit to output the image data based on the detection result indicating that the external power is supplied.

2. The image processing apparatus of claim 1, further comprising:
a device communication unit to communicate with a device identified by the destination address via at least one of wired line and wireless line,
wherein the facsimile data output control unit notifies, via the device communication unit, the identified device of e-mail transmission of the facsimile data when the facsimile data is transmitted via e-mail with the mail communication unit.

3. The image processing apparatus of claim 1, further comprising:
a notification unit to output notification information,
wherein the facsimile data output control unit causes the notification unit to notify e-mail transmission of the facsimile data when the facsimile data is transmitted via e-mail with the mail communication unit to the destination address.

4. The image processing apparatus of claim 3, wherein the notification unit is at least one of a display to display information and a speaker to output an amplified sound.

5. The image processing apparatus of claim 1, further comprising:
a telephone connection unit to connect the image processing apparatus to an external telephone; and
a sounding unit to sound the external telephone,
wherein the facsimile data output control unit causes the sounding unit to sound the external telephone to notify e-mail transmission of the facsimile data when the facsimile data is transmitted via e-mail with the mail communication unit to the destination address.

6. The image processing apparatus of claim 5, further comprising:
a voice data storing unit to store voice data that notifies e-mail transmission of the facsimile data via e-mail;
a voice data sending unit to send the voice data to the external telephone via the telephone connection unit; and
an off-hook detection unit to detect off-hook of the external telephone,
wherein the facsimile data output control unit causes the sounding unit to sound the external telephone to notify e-mail transmission of the facsimile data when the facsimile data is transmitted via e-mail with the mail communication unit, and causes the voice data sending unit to send the voice data when the off-hook detection unit detects off-hook of the external telephone.

7. The image processing apparatus of claim 1, further comprising:
a selecting unit to receive a user input that selects whether or not to perform e-mail transmission of the facsimile data to the destination address,
wherein the facsimile data output control unit conducts e-mail transmission when e-mail transmission is selected.

8. The image processing apparatus of claim 1, wherein the facsimile communication unit includes:
a number acquisition unit to acquire a telephone number of a transmitting source of the facsimile data, and the facsimile data output control unit causes the outputting unit to output the image of the facsimile data when the telephone number of the transmitting source of the facsimile data is a pre-registered telephone number.

9. The image processing apparatus of claim 1, further comprising:
an available space confirming unit to confirm available space on a mail server that stores e-mail data; and
a notification unit to output notification information,
wherein the facsimile data output control unit causes the notification unit to report information indicating that the facsimile data is not transmitted via e-mail due to insufficient space on the mail server.

10. The image processing apparatus of claim 1, further comprising:
an available space confirming unit to confirm available space on a mail server that stores e-mail data; and
a wireless mail transmitting unit to directly transmit, wirelessly, the facsimile data to the destination address via e-mail,
wherein the facsimile data output control unit causes the wireless mail transmitting unit to directly transmit, wirelessly, the facsimile data to the destination address via e-mail when space on the mail server is insufficient.

11. A method of controlling output of facsimile data, comprising:
operating the image processing apparatus using external power supplied from an external power source, or using stored power stored in a power-storing unit;
detecting whether the apparatus is operated with the external power supplied from the external power source or the stored power supplied from the power-storing unit to output a detection result,
wherein, when a facsimile communication unit of the apparatus receives facsimile data, the method further comprising:
converting, when the facsimile communication unit completes receipt of all of the facsimile data, the facsimile data into a data format corresponding to mail transmission and causes a mail communication unit of the apparatus to transmit the converted data to a destination address via e-mail based on the detection result indicating that the stored power is supplied; and
converting the facsimile data into image data corresponding to an image to be output by an outputting unit of the apparatus and causing the outputting unit to output the image based on the detection result indicating that the external power is supplied.

12. A non-transitory recording medium storing a plurality of instructions which, when executed by one or more processors, cause the processors to perform a method of controlling output of facsimile data, comprising:
operating the image processing apparatus with external power supplied from an external power source, or stored power stored in a power-storing unit;
detecting whether the apparatus is operated with the external power supplied from the external power source or the stored power supplied from the power-storing unit to output a detection result,
wherein, when a facsimile communication unit of the apparatus receives facsimile data, the method further comprising:
converting, when the facsimile communication unit completes receipt of all of the facsimile data, the facsimile data into a data format corresponding to mail transmission and causes a mail communication unit of the apparatus to transmit the converted data to a destination address via e-mail based on the detection result indicating that the stored power is supplied; and
converting the facsimile data into image data corresponding to an image to be output by an outputting unit of the apparatus and causing the outputting unit to output the image based on the detection result indicating that the external power is supplied.

* * * * *